(12) United States Patent
Lee et al.

(10) Patent No.: US 10,591,061 B2
(45) Date of Patent: Mar. 17, 2020

(54) GASKET AND THE MANUFACTURING METHOD THEREOF

(71) Applicant: KUK IL INNTOT CO., LTD., Ulsan (KR)

(72) Inventors: Jong Chul Lee, Ulsan (KR); Eui Hwan Son, Ulsan (KR)

(73) Assignee: KUL IL INNTOT CO., LTD., Ulsan (KR)

( * ) Notice: Subject to any disclaimer, the term of this patent is extended or adjusted under 35 U.S.C. 154(b) by 506 days.

(21) Appl. No.: 15/066,329

(22) Filed: Mar. 10, 2016

(65) Prior Publication Data

US 2016/0265663 A1    Sep. 15, 2016

Related U.S. Application Data

(60) Provisional application No. 62/132,690, filed on Mar. 13, 2015, provisional application No. 62/300,309, filed on Feb. 26, 2016.

(51) Int. Cl.
| | |
|---|---|
| *F16J 15/08* | (2006.01) |
| *F16J 15/02* | (2006.01) |
| *F16L 23/20* | (2006.01) |
| *F16J 15/12* | (2006.01) |
| *F16L 23/18* | (2006.01) |
| *F16L 23/24* | (2006.01) |

(52) U.S. Cl.
CPC ......... *F16J 15/0887* (2013.01); *F16J 15/022* (2013.01); *F16J 15/0806* (2013.01); *F16J 15/121* (2013.01); *F16J 15/128* (2013.01); *F16L 23/18* (2013.01); *F16L 23/20* (2013.01); *F16L 23/24* (2013.01)

(58) Field of Classification Search
CPC ................ F16J 15/0818; F16J 15/0887; F16J 2015/0837; F16J 15/123; F16J 15/022; F16L 23/18
See application file for complete search history.

(56) References Cited

U.S. PATENT DOCUMENTS

| | | | | |
|---|---|---|---|---|
| 1,793,423 | A * | 2/1931 | Fitzgerald | F16J 15/123 277/601 |
| 1,846,402 | A * | 2/1932 | Oven | F16J 15/123 277/601 |
| 2,157,102 | A * | 5/1939 | Victor | F16J 15/123 277/601 |
| 3,909,019 | A * | 9/1975 | Leko | F16J 15/0825 277/649 |
| 4,662,643 | A * | 5/1987 | Rosenquist | F16J 15/123 277/597 |

(Continued)

FOREIGN PATENT DOCUMENTS

| | | | | |
|---|---|---|---|---|
| FR | 1095569 | A * | 6/1955 | ............. F16J 15/128 |
| GB | 2278651 | A * | 12/1994 | ............. F16J 15/104 |

(Continued)

*Primary Examiner* — Eugene G Byrd
(74) *Attorney, Agent, or Firm* — Cantor Colburn LLP

(57) ABSTRACT

Provided is a gasket being interposed between the flanges which are the connecting portions of the pipes. The gasket includes: a first jacket; a kammprofile provided in the first jacket; an O-ring member provided at the inner side of the kammprofile; and a second jacket encasing a portion of the first jacket, the kammprofile, and the O-ring member. A method of manufacturing the gasket is provided.

6 Claims, 41 Drawing Sheets

(56) References Cited

U.S. PATENT DOCUMENTS

| | | | | |
|---|---|---|---|---|
| 4,998,741 A * | 3/1991 | Udagawa | F16J 15/0825 | 277/595 |
| 5,165,372 A * | 11/1992 | Miyaoh | F16J 15/0825 | 123/193.3 |
| 5,201,534 A * | 4/1993 | Miyaoh | F16J 15/0825 | 277/595 |
| 5,277,433 A * | 1/1994 | Ishikawa | F16J 15/0825 | 277/593 |
| 5,306,023 A * | 4/1994 | Udagawa | F16J 15/0825 | 277/601 |
| 5,449,181 A * | 9/1995 | Miyaoh | F16J 15/0825 | 277/595 |
| 5,460,387 A * | 10/1995 | Miyaoh | F02F 11/002 | 277/601 |
| 5,505,466 A * | 4/1996 | Willis | F02F 11/002 | 277/593 |
| 5,511,796 A * | 4/1996 | Udagawa | F16J 15/0825 | 277/593 |
| 5,549,307 A * | 8/1996 | Capretta | F16J 15/0825 | 277/595 |
| 5,601,294 A * | 2/1997 | Stritzke | F16J 15/123 | 277/597 |
| 5,775,701 A * | 7/1998 | Martini | F16J 15/0887 | 277/591 |
| 6,139,024 A * | 10/2000 | Yakushiji | F16J 15/0825 | 277/592 |
| 6,315,303 B1 * | 11/2001 | Erb | F16J 15/0825 | 277/593 |
| 9,464,718 B2 * | 10/2016 | Lee | F16J 15/0887 | |
| 2002/0063395 A1 * | 5/2002 | Klinner | F16J 15/0818 | 277/592 |
| 2003/0178788 A1 * | 9/2003 | Larson | F16J 15/123 | 277/590 |
| 2004/0041352 A1 * | 3/2004 | Hohe | F16J 15/0818 | 277/593 |
| 2005/0116427 A1 * | 6/2005 | Seidel | F16J 15/0818 | 277/610 |
| 2005/0121859 A1 * | 6/2005 | Seidel | F16J 15/061 | 277/628 |
| 2010/0225070 A1 * | 9/2010 | Kinoshita | F16J 15/0825 | 277/592 |
| 2011/0156352 A1 * | 6/2011 | Bond | F16J 15/064 | 277/312 |
| 2013/0249171 A1 * | 9/2013 | Kolb | F16J 15/0806 | 277/608 |
| 2014/0333035 A1 * | 11/2014 | Schemmann | F16J 15/02 | 277/602 |

FOREIGN PATENT DOCUMENTS

| | | | | |
|---|---|---|---|---|
| JP | 59229036 A | * | 12/1984 | F16J 15/123 |
| JP | 59229037 A | * | 12/1984 | F16J 15/0825 |

* cited by examiner

GASKET AND THE MANUFACTURING METHOD THEREOF

BACKGROUND

1. Technical Field

The present invention relates to a gasket, more specifically to a metal gasket having a structure wherein a pair of metal jackets encases both the upper side and the lower side of a kammprofile.

2. Description of Related Art

Gasket is a general term of a static seal which is coupled to a stationary joint surface and the like of a pressure container, a tube flange, and a mechanical apparatus with bolt(s) and the like for preventing leaks, and various kinds of shapes, materials, and the like are used according to the usage state of type, pressure, temperature, and the like of the operating fluids.

At first, gaskets have been simply used using materials such as paper, leather, and the like. However, various shapes and materials are being used recently, as the operational conditions have become complicated and rigorous.

That is, a gasket is inserted between the two pipe bodies being connected to each other in order to prevent the leakage of a fluid through the gap between the two pipe bodies. For example, a gasket is interposed between the flanges which are the connecting portions of the pipe bodies such as valves, pipes, or the like which transfer fluids so as to prevent the leakage of the fluids, and at the same time, has a sealing function which prevents the external substances from being entering into the inside of the pipe bodies. That is, when coupling flanges of valves, pipes, and the like, the volume of the gasket is compressed by the pressure applied along the axis so that the joint between the flanges, which are the connecting portions thereof, is blocked from the outside.

Such a gasket, which is actually installed in a plant and being used must maintain the sealing state in response to various environments and conditions.

For example, the size and the position of the flanges, and the bolting process for joining should be considered. More particularly, when the operating condition is a continuous repetition of heating and cooling so that a high-temperature and high-pressure fluid is repeatedly flowing inside the pipe body, maintaining the perfect flatness of the flanges 2, which are the connecting portions of the pipe bodies 1, along the horizontal direction becomes difficult, therefore the gap between the flanges 2 may unevenly widened as illustrated in FIG. 1 (D2>D1).

That is, the gasket installed between the flanges must overcome this difference and maintain the sealing state, and in order to achieve this, the yield point of the gasket along the sealing direction must be high and the restoring strength thereof must be large.

However, under the state wherein gaps A, B, and C are present between the contact surface of the flanges of the pipe bodies as illustrated in FIG. 2, when the gasket is installed with a high load or re-bolting work is performed on the operating flanges, the hoops 5 or the fillers 6 of the spiral wound gasket of the prior art could be separated through these gaps, therefore there is a risk in that the gasket is damaged and the fluid are being leaked.

SUMMARY

An objective of the present invention devised to solve above described problems is to provide a gasket and the manufacturing method thereof wherein the sealing property is further enhanced by providing an O-ring member between a kammprofile provided with serrations in the upper and the lower surfaces thereof and a metal jacket.

Another objective of the present invention is to provide a gasket and the manufacturing method thereof wherein the sealing property is further enhanced by providing a spring inside the O-ring member.

Yet another objective of the present invention is to provide a gasket and the manufacturing method thereof wherein the durability is further enhanced by forming a concave or a convex end portions in one side or in both sides of the kammprofile.

Still yet another objective of the present invention is to provide a gasket and the manufacturing method thereof wherein the damage of the sealing surface of the gasket can be prevented through the sealing layer provided in the first jacket and the second jacket, thereby further enhancing the sealing property.

The present invention for achieving the above described objectives provides a gasket, being interposed between the flanges which are the connecting portions of the pipes, wherein the gasket is characterized in that and includes:
a first jacket;
a kammprofile provided in the first jacket;
an O-ring member provided at the inner side of the kammprofile; and
a second jacket encasing a portion of the first jacket, the kammprofile, and the O-ring member.

In addition, the present invention provides a gasket, being interposed between the flanges which are the connecting portions of the pipes, wherein the gasket is characterized in that and includes:
a first jacket;
a kammprofile provided in the first jacket;
an O-ring member provided at the outer side of the kammprofile; and
a second jacket encasing a portion of the first jacket, the kammprofile, and the O-ring member.

In addition, the present invention provides a gasket, being interposed between the flanges which are the connecting portions of the pipes, wherein the gasket is characterized in that and includes:
a first jacket;
a kammprofile provided in the first jacket;
an O-ring member provided at the inner side and the outer side of the kammprofile; and
a second jacket encasing a portion of the first jacket, the kammprofile, and the O-ring member.

In addition, a gasket is provided as
characterized in that
sawtooth-like grooves are formed on the upper surface of the kammprofile, and sawtooth-like grooves are formed in the lower surface of the kammprofile.

In addition, a gasket is provided as
characterized in that
the grooves are formed through the serration process.

In addition, a gasket is provided as
characterized in that
the first jacket is formed to be flat.

In addition, a gasket is provided as
characterized in that
the second jacket is wider than the first jacket, and the second jacket is being bended and encases a portion of the first jacket, the kammprofile, and the O-ring member.

In addition, a gasket is provided as characterized in that a spring is provided inside the O-ring member.

In addition, a gasket is provided as characterized in that the spring is a flat coil spring.

In addition, a gasket is provided as characterized in that an inner side end portion having a concave curvature is formed in the kammprofile so as to be in tight contact with the O-ring member.

In addition, a gasket is provided as characterized in that an outer side end portion having a convex curvature is formed in the outer portion of the kammprofile where the first jacket or the second jacket is to be in contact with.

In addition, a gasket is provided as characterized in that the first jacket is being bended and encases the kammprofile and the O-ring member.

In addition, a gasket is provided as characterized in that an outer side end portion having a concave curvature is formed in the kammprofile so as to be in tight contact with the O-ring member.

In addition, a gasket is provided as characterized in that an inner side end portion having a convex curvature is formed in the inner portion of the kammprofile where the first jacket or the second jacket is to be in contact with.

In addition, a gasket is provided as characterized in that sealing layers are formed in the lower surface of the first jacket and in the upper surface of the second jacket respectively.

In addition, a gasket is provided as characterized in that the sealing layers are formed with any one of carbon, mica, polytetrafluoroethylene (PTFE), silver, atomized stainless steel, and ceramics or a combination of these elements.

In addition, the present invention provides a manufacturing method of a gasket characterized in that and includes the steps of:
preparing a first jacket;
laying down a kammprofile on the first jacket;
laying down an O-ring member in the inner side of the kammprofile; and
bending a second jacket and encasing a portion of the first jacket, the kammprofile, and the O-ring member.

In addition, the present invention provides a manufacturing method of a gasket characterized in that and includes the steps of:
preparing a first jacket;
laying down a kammprofile on the first jacket;
laying down an O-ring member in the outer side of the kammprofile; and
bending a second jacket and encasing a portion of the first jacket, the kammprofile, and the O-ring member.

In addition, the present invention provides a manufacturing method of a gasket characterized in that and includes the steps of:
preparing a first jacket;
laying down a kammprofile on the first jacket;
laying down an O-ring members in the inner side and in the outer side of the kammprofile; and
bending a second jacket and encasing a portion of the first jacket, the kammprofile, and the O-ring members.

In addition, a manufacturing method of a gasket is provided as characterized in that sawtooth-like grooves are formed on the upper surface of the kammprofile, and sawtooth-like grooves are formed in the lower surface of the kammprofile.

In addition, a manufacturing method of a gasket is provided as characterized in that the sawtooth-like grooves are formed through the serration process.

In addition, a manufacturing method of a gasket is provided as characterized in that the first jacket is formed to be flat.

In addition, a manufacturing method of a gasket is provided as characterized in that the second jacket is wider than the first jacket, and the second jacket is being bended and encases a portion of the first jacket, the kammprofile, and the O-ring member.

In addition, a manufacturing method of a gasket is provided as characterized in that a spring is provided inside the O-ring member.

In addition, a manufacturing method of a gasket is provided as characterized in that the spring is a flat coil spring.

In addition, a manufacturing method of a gasket is provided as characterized in that an inner side end portion having a concave curvature is formed in the kammprofile so as to be in tight contact with the O-ring member.

In addition, a manufacturing method of a gasket is provided as characterized in that an outer side end portion having a convex curvature is formed in the outer portion of the kammprofile where the first jacket or the second jacket is to be in contact with.

In addition, a manufacturing method of a gasket is provided as characterized in that the first jacket is being bended and encases the kammprofile and the O-ring member.

In addition, a manufacturing method of a gasket is provided as characterized in that an inner side end portion having a convex curvature is formed in the inner portion of the kammprofile where the first jacket or the second jacket is to be in contact with.

In addition, a manufacturing method of a gasket is provided as characterized in that and further includes the step of:
forming sealing layers in the lower surface of the first jacket and in the upper surface of the second jacket respectively, after the step of bending the second jacket and encasing a portion of the first jacket, the kammprofile, and the O-ring members.

In addition, a manufacturing method of a gasket is provided as characterized in that the sealing layers are formed with any one of carbon, mica, polytetrafluoroethylene (PTFE), silver, atomized stainless steel, and ceramics or a combination of these elements.

DETAILED DESCRIPTION OF EMBODIMENTS

Figure 1:
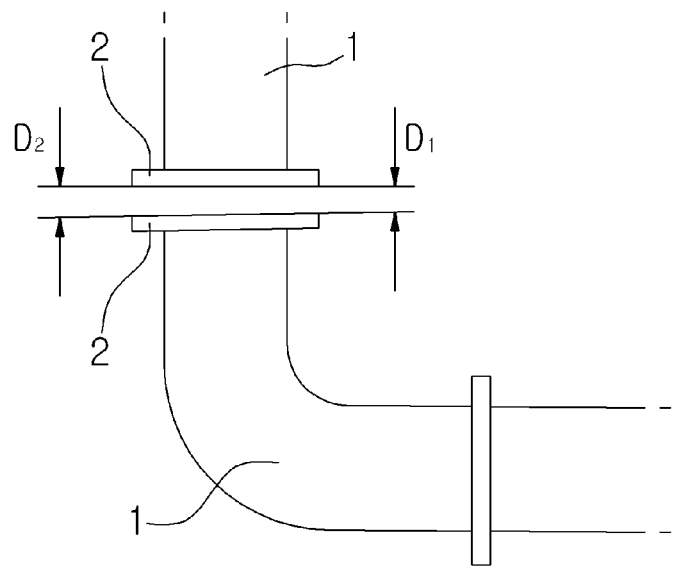
FIG. 1 is a view illustrating the flanges provided with a gasket therebetween and unevenly widened (separated).
Figure 2:
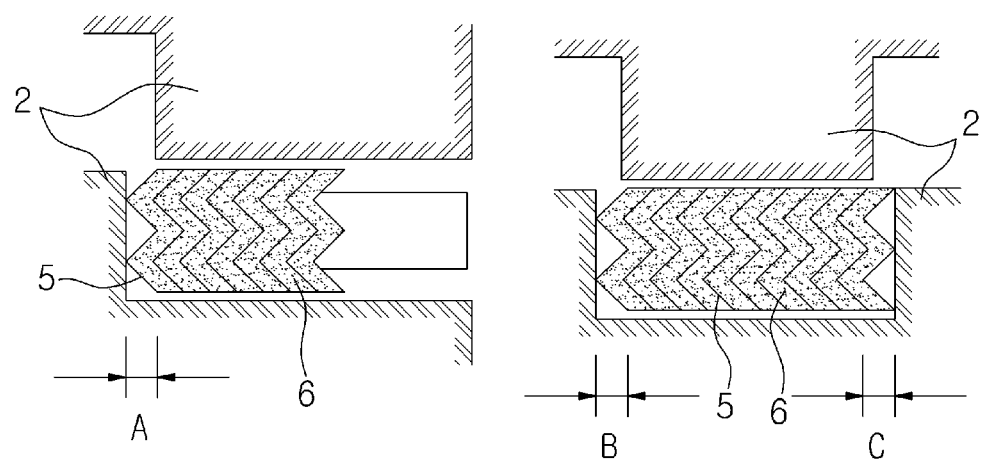
FIG. 2 is a view illustrating the occurrence of gaps between the contact surfaces of the flanges.

Hereinafter, exemplary embodiments of the present invention will be described in detail with reference to the accompanying drawings. Since various changes can be applied to the present invention which may also have a variety of forms, specific exemplary embodiments shall be illustrated in the drawings as examples and described in detail in the text. However, it is not intended to limit the present invention to the specific forms disclosed herein, but it should be understood to include all modifications, equivalents and substitutes included in the spirit and scope of the present invention.

Figure 3:
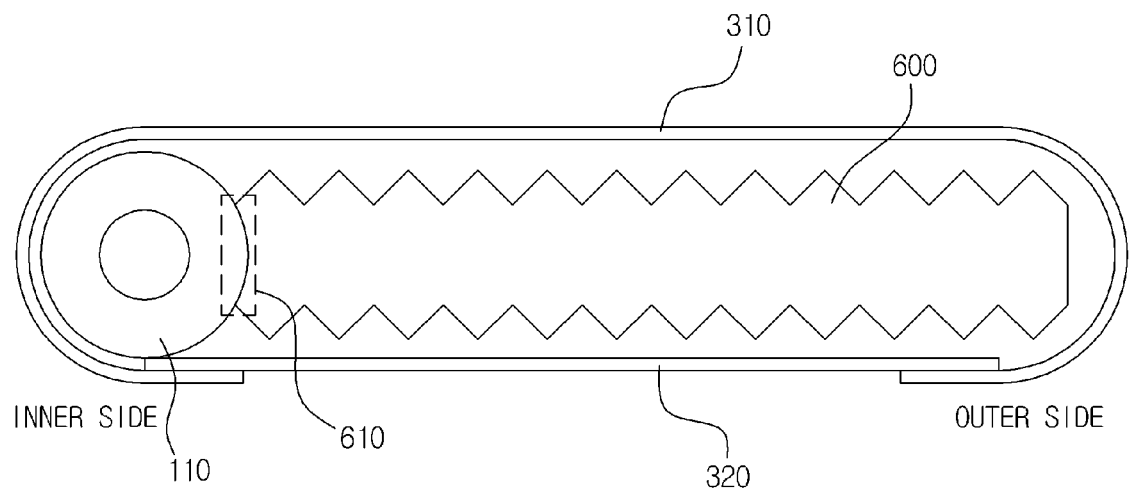
FIG. 3 is a view illustrating a modified form of the gasket according to the first exemplary embodiment of the present invention.

Gaskets of the exemplary embodiments of the present invention may have the shape of a ring in overall as shown in FIG. 3, however, they are not limited to this but may be implemented in various forms such as oval, oblong square, diamond, an the like as necessary.

First, the kammprofile 600 being used in various exemplary embodiments of the present invention may be made of stainless steel or Inconel which is a high temperature metal in order to maintain the excellent compression power and the restoring force under the extreme conditions such as high temperature, high pressure, and the like. More specifically, stainless steel 347, Inconel 825, and the like may be used for forming the kammprofile.

However, other than those mentioned above, stainless steel 300 series, 400 series, and many other series may be selected and used, and the usage of special materials such as Inconel 600 series, 700 series, 800 series, and the like are not limited thereby.

The gasket according to various exemplary embodiments of the present invention has an effect in that the excellent compression power and the restoring force can be maintained under the extreme conditions such as high temperature, high pressure, and the like by inserting a kammprofile 600 inside the sheath of the double jacket structure.

Besides, due to such excellent compression power and the restoring property the effect of enhancing the sealing effect can be achieved, and a gasket, having high resistance against damages to the gasket caused by a cold flow or high seating stress, can be provided as well. In addition, by achieving such resistance property there is an effect in that a gasket having an excellent stability can be provided when installing and handling thereof for a large sized (flange).

That is, the compression property of the gasket adopting kammprofile 600 according to various exemplary embodiments of the present invention may not that good when compared to that of the spiral wound gasket, however, it has a special feature that can be used under high temperature and high pressure conditions.

In addition, the kammprofile 600 of the gasket according to various exemplary embodiments of the present invention plays a role of a stopper, there is an effect in that it has a high mountability without a damage to the flat portion of an abnormal flange.

Furthermore, there is an effect in that a sufficient surface stress can be provided without a damage at a high compression strength. Here, the term 'sufficient surface stress' means that the rigorous conditions from adequate bolt torque to hot bolting are included therein.

Sawtooth-like groove members may be formed on the upper surface and the lower surface of such kammprofile 600. Such sawtooth-like groove members may be formed through the serration process. The gasket according to various exemplary embodiments of the present invention has an effect in that the sealing property without any leaks under low seating stress is maintained by concentrating the weight of the fastening bolt on the peak portions of the sawtooth-like groove members formed on the upper surface and the lower surface of the kammprofile 600.

Figure 4:
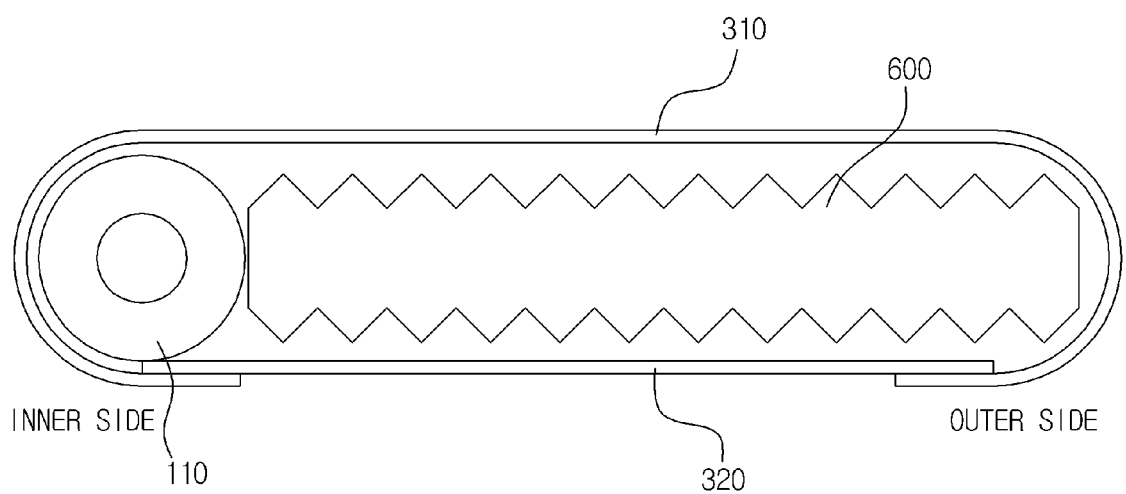
FIG. 4 is a view illustrating a gasket according to the first exemplary embodiment of the present invention.

FIGS. 3 and 4 are the views illustrating the gaskets and the modified forms thereof according to the first exemplary embodiment of the present invention.

A gasket according to the first exemplary embodiment of the present invention may comprise a kammprofile 600, an O-ring member 110, a first jacket 320, and a second jacket 310 as can be checked in FIG. 4. More specifically, the kammprofile 600 may be laid on the first jacket 320, and an O-ring member 110 may be provided in the inner side of such kammprofile 600. In addition, the second jacket 310 may be bended from the upper portion of the gasket to encase the kammprofile 600, the O-ring member 110, and a portion of the first jacket 320.

FIG. 3 is a view illustrating a modified form of the first exemplary embodiment of the present invention, and an inner end portion 610 having a concave curvature may be formed in the inner side of the kammprofile 600 provided inside the gasket so as to be in tight contact with the O-ring member 110. Due to such inner end portion 610 damages to the O-ring member 110 caused by the left-to-right movement of the kammprofile 600 inside the gasket can be avoided, thus, an effect of further enhancing the sealing property of the gasket can be achieved thereby.

FIGS. 5 to 8 are views illustrating the gaskets and the modified forms thereof according to the second exemplary embodiment of the present invention.

Figure 8:
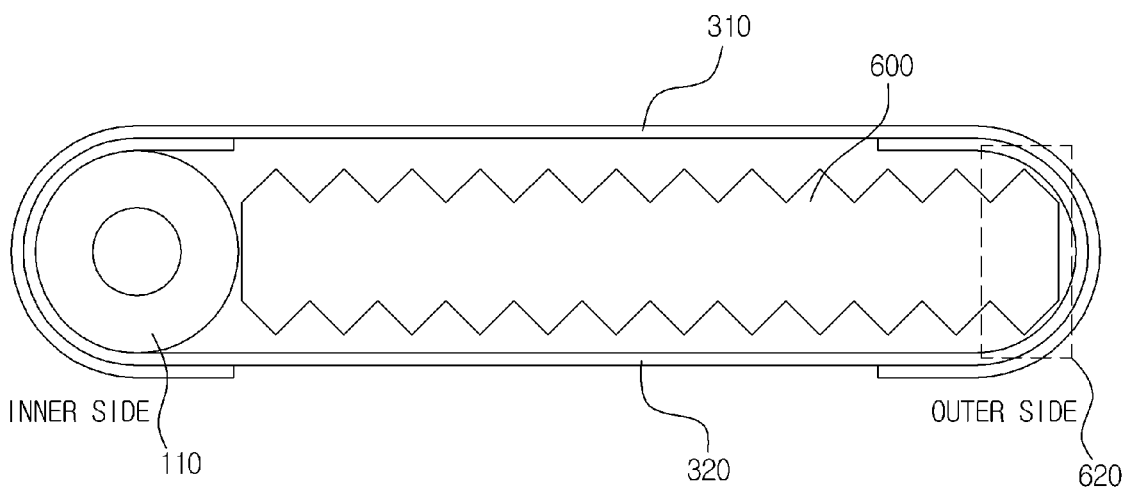
FIG. 8 is a view illustrating a gasket according to the second exemplary embodiment of the present invention.
Figure 9:
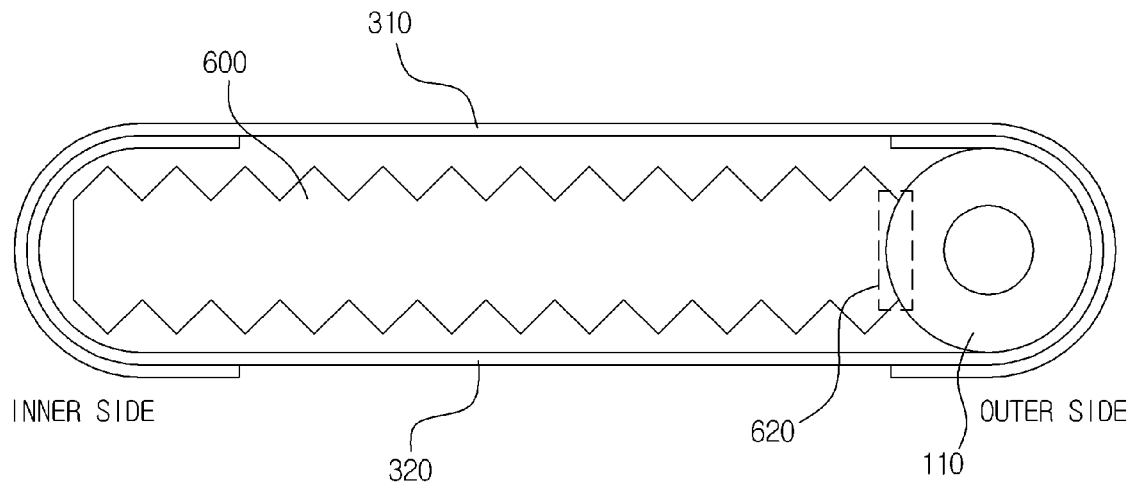
FIG. 9 is a view illustrating a gasket according to the third exemplary embodiment of the present invention.
Figure 10:
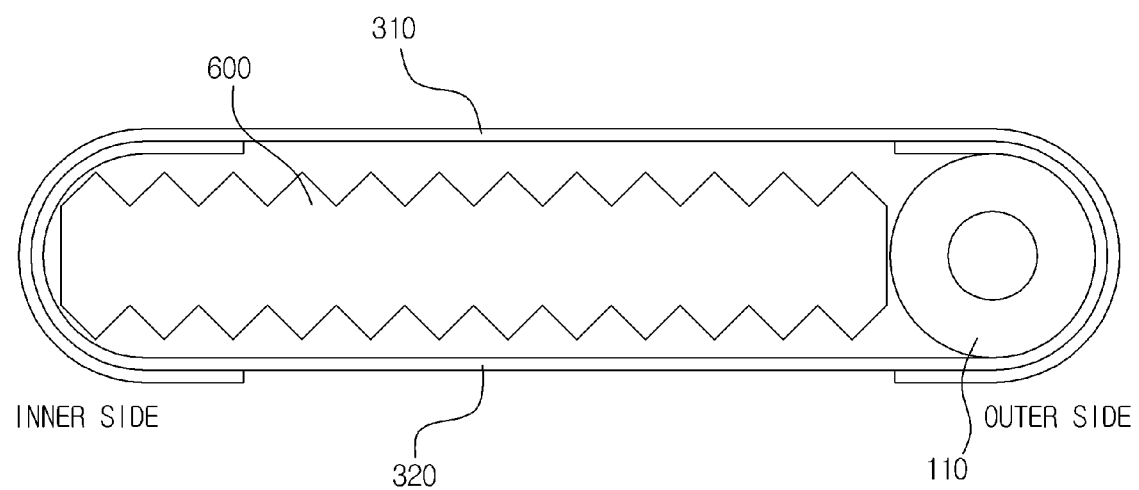
FIG. 10 is a view illustrating a modified form of the gasket according to the third exemplary embodiment of the present invention.
Figure 11:
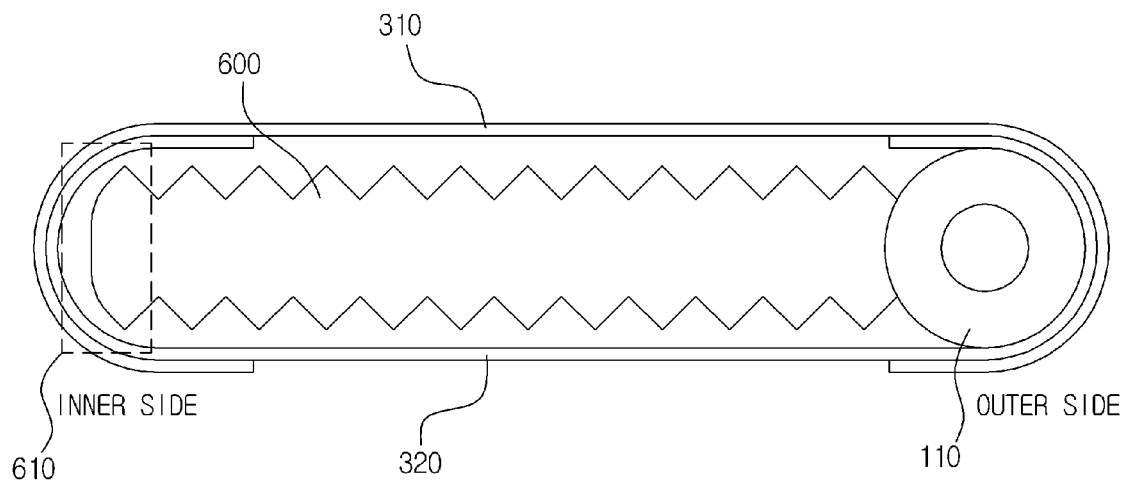
FIG. 11 is a view illustrating a modified form of the gasket according to the third exemplary embodiment of the present invention.
Figure 12:
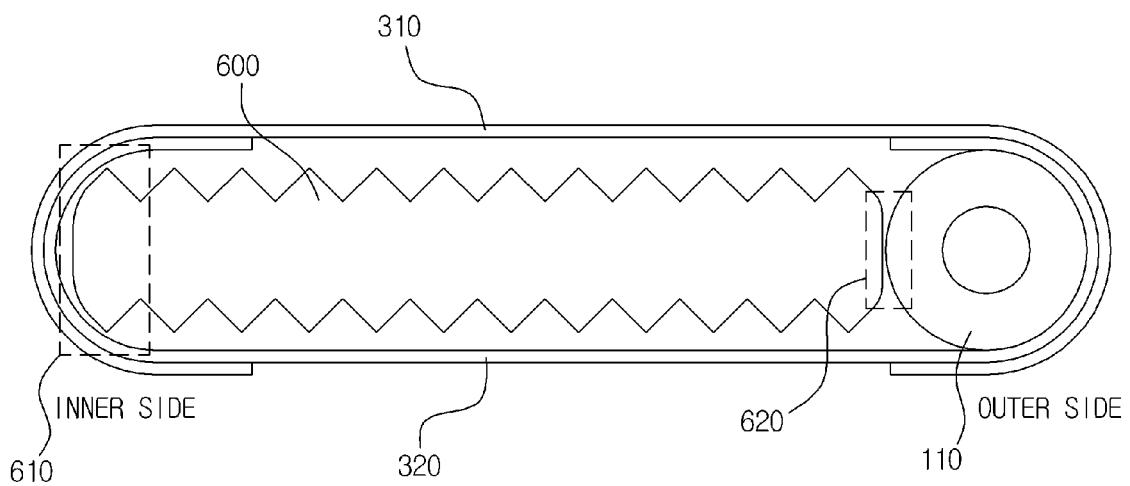
FIG. 12 is a view illustrating a modified form of the gasket according to the third exemplary embodiment of the present invention.

A gasket according to the second exemplary embodiment of the present invention may be formed with a first jacket 320, a kammprofile 600, an O-ring member 110, and a second jacket 310 as can be checked in FIG. 8. The the gasket according to the second exemplary embodiment is different from the gasket according to the first exemplary embodiment in that the first jacket 320 is bended upwards so as to encase (accommodate) the kammprofile 600 and the O-ring member 110 inside thereof.

Figure 5:
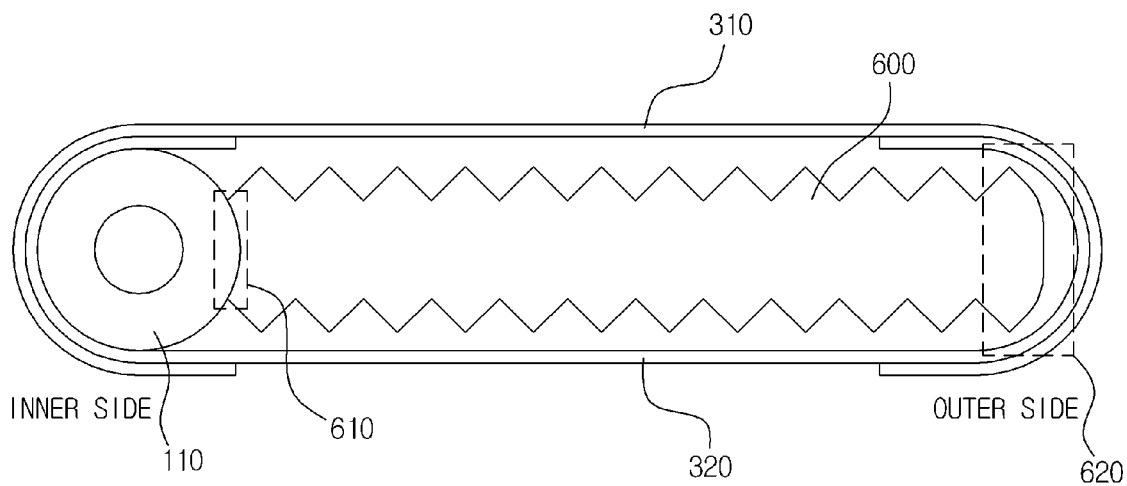
FIG. 5 is a view illustrating a modified form of the gasket according to the second exemplary embodiment of the present invention.
Figure 6:
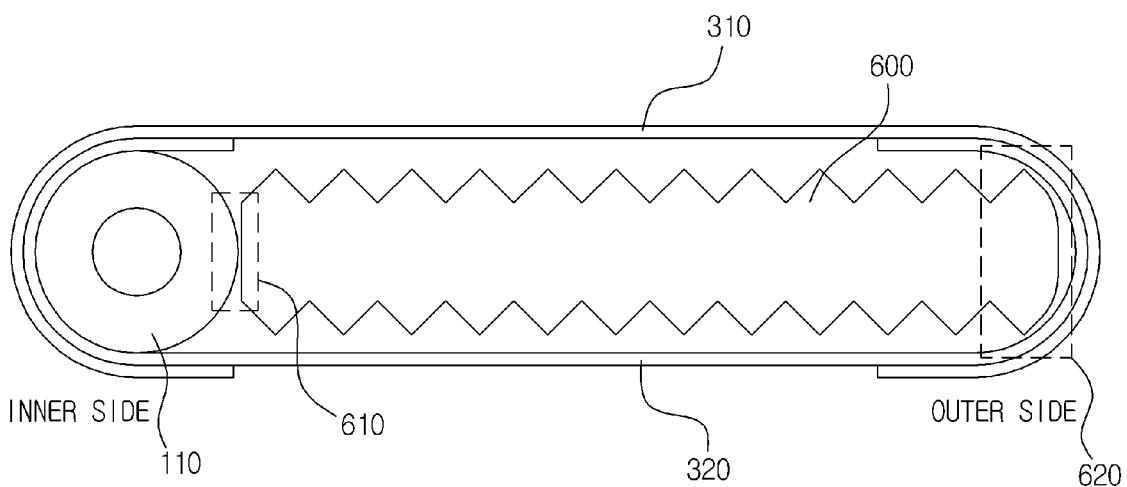
FIG. 6 is a view illustrating a modified form of the gasket according to the second exemplary embodiment of the present invention.
Figure 7:
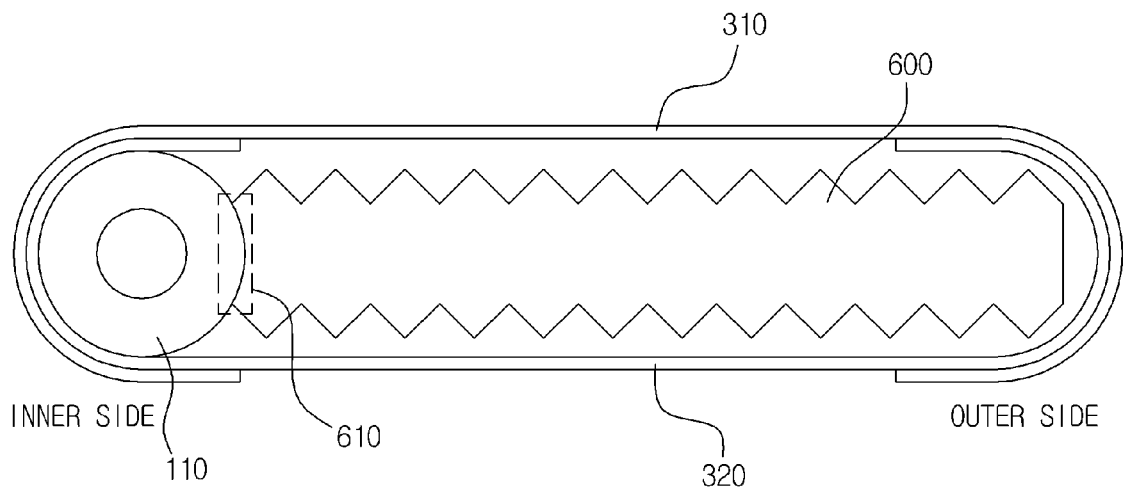
FIG. 7 is a view illustrating a modified form of the gasket according to the second exemplary embodiment of the present invention.

FIGS. 5 to 7 are the views illustrating the modified forms of the second exemplary embodiment, the gasket in FIG. 5 is made to be a concave shape so that the inner side end portion 610 of the kammprofile 600 is in tight contact with the O-ring member 110, and the outer side end portion 620 is made to have a convex curvature with a smooth edge as can be checked in the drawing. In addition, it can be checked that the both end portions of the kammprofile 600 of the gasket in FIG. 6 are formed to have a convex curvature, and it can be checked in the drawing that the gasket in FIG. 7 is formed in a way that only the inner side end portion 610 of the kammprofile 600 inside the gasket is formed to have a concave curvature so as to be in tight contact with the O-ring member.

The second exemplary embodiment of the present invention and the modified form thereof have an effect in that gasket which is more strong against external pressure can be provided by preventing damages to the first jacket 320 and the second jacket 310 through the structures that can be checked in the drawings.

Besides, since the inner side and the outer side of the gasket are doubly protected by the first jacket 320 and the second jacket 310, there is an effect that a gasket which is more strong against external pressure and having an enhanced sealing capability can be provided.

FIGS. 9 to 12 are views illustrating the gaskets and the modified forms thereof according to the third exemplary embodiment of the present invention.

The gaskets and the modified forms thereof according to the third exemplary embodiment of the present invention are different from the gaskets according to the second exemplary embodiment in that the O-ring member 110 inside the gasket is located in the outer portion of the gasket.

That is, while the gaskets according to the first and the second exemplary embodiments of the present invention provide a more effective sealing property against the pressure transferred from the inside of the pipe flange to the gasket by locating the O-ring member 110 in the inner side, the third exemplary embodiment of the present invention has an effect in that the sealing properties can be obtained by locating the O-ring member 110 in the outer side since the O-ring member 110 is expanded under a situation of low seating stress wherein the fastening of the bolt of the pipe flange become loosened.

Figure 13:
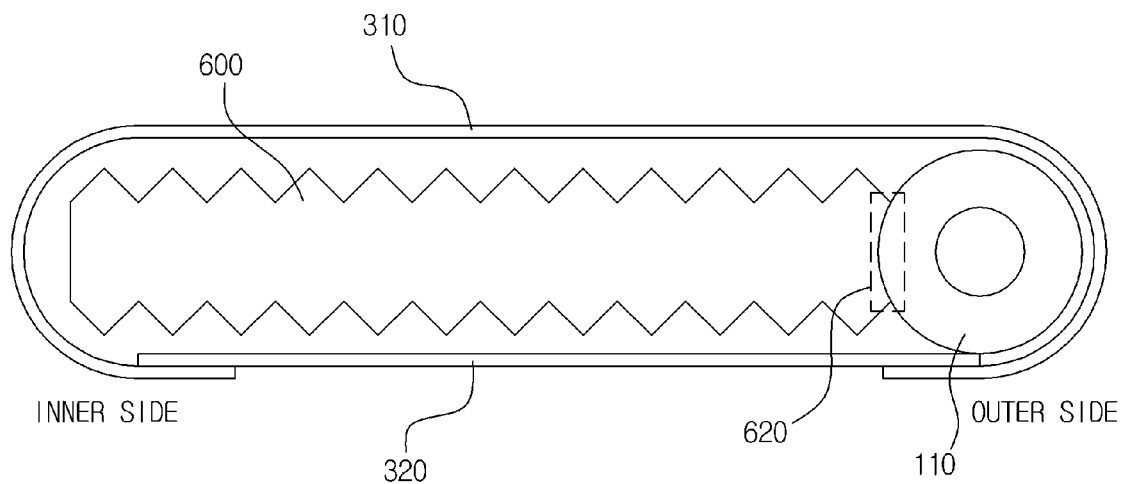
FIG. 13 is a view illustrating a gasket according to the fourth exemplary embodiment of the present invention.
Figure 14:
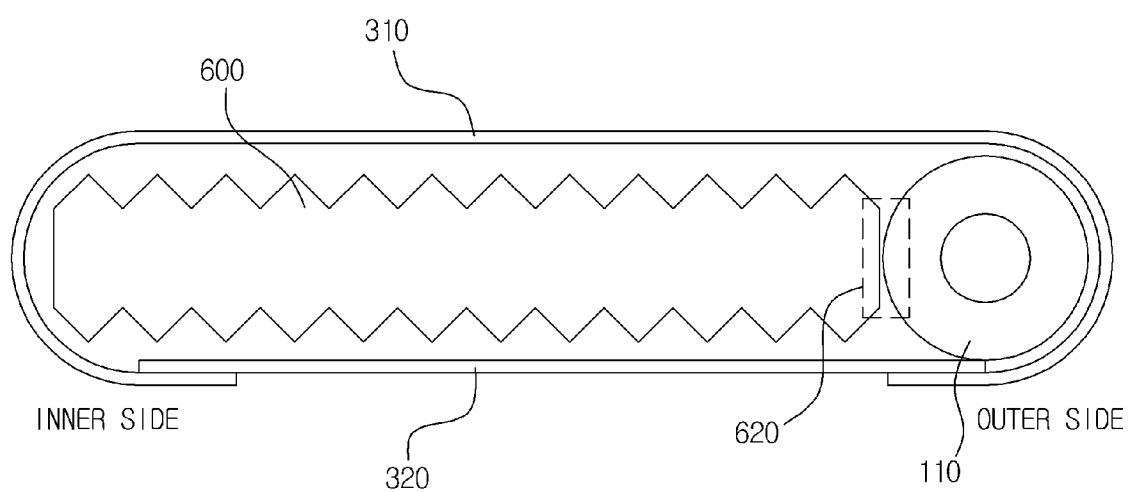
FIG. 14 is a view illustrating a modified form of the gasket according to the fourth exemplary embodiment of the present invention.

FIGS. 13 to 14 are views illustrating the gaskets and the modified forms thereof according to the fourth exemplary embodiment of the present invention.

The first jacket 320 of the gasket of the fourth exemplary embodiment of the present invention is made to be flat when compared to that of the third exemplary embodiment, and it is a gasket that can be used under the lower pressure condition and reduce the manufacturing cost thereof through the size reduction of the first jacket.

Figure 15:
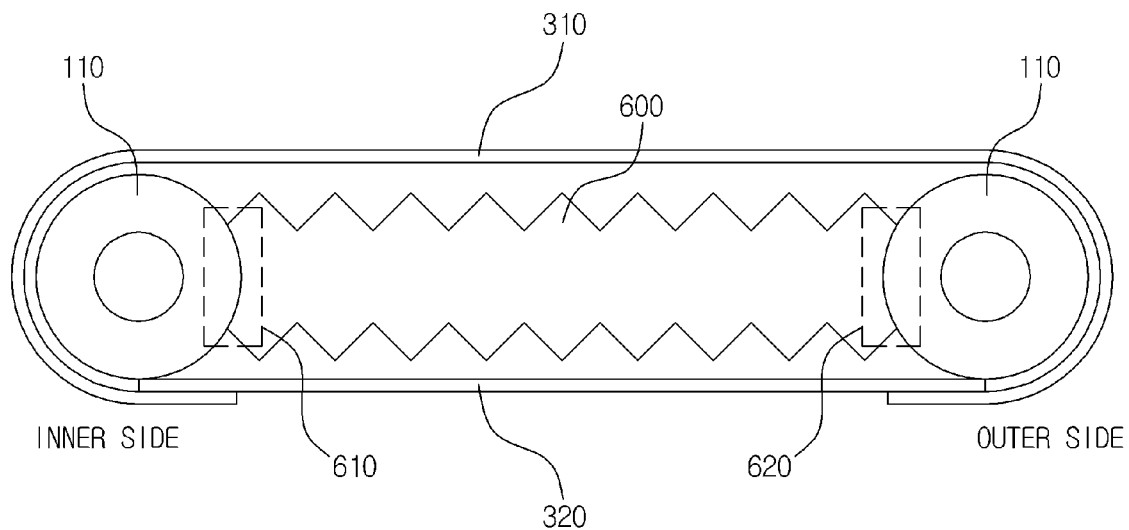
FIG. 15 is a view illustrating a gasket and the modified form thereof according to the fifth exemplary embodiment of the present invention.
Figure 16:
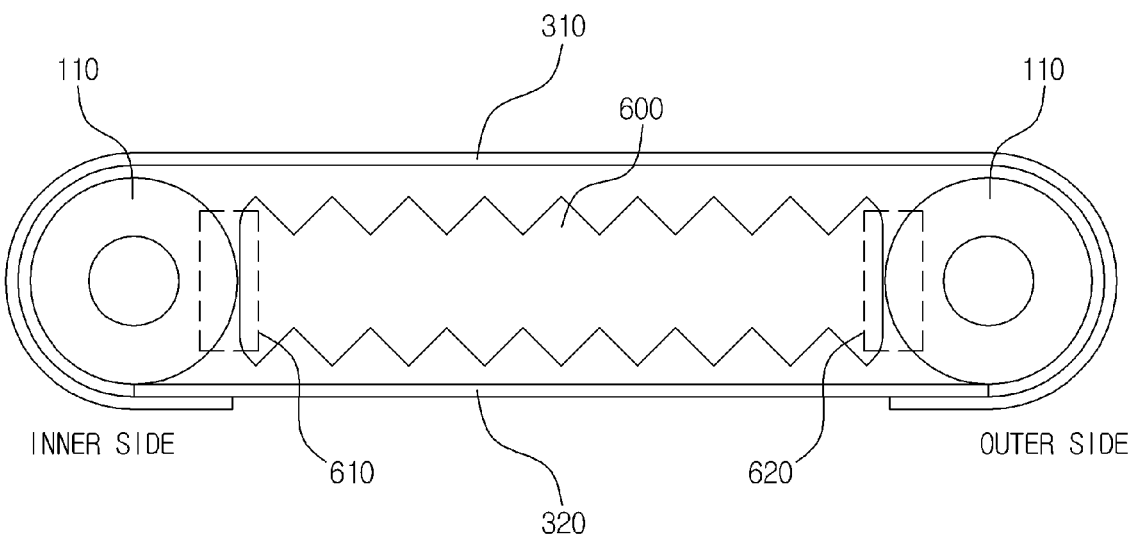
FIG. 16 is a view illustrating a modified form of the gasket according to the fifth exemplary embodiment of the present invention.

FIGS. 15 to 16 are views illustrating the gaskets and the modified forms thereof according to the fifth exemplary embodiment of the present invention.

A gasket according to the fifth exemplary embodiment of the present invention may be provided with O-ring members 110 in both of the inner portion and the outer portion of the kammprofile 600. The both of the inner side end portion 610 and the outer side end portion 620 may have a concave curvature so as to be in tight contact with the O-ring members 110 respectively.

In addition, the gasket in FIG. 16 which is a modified form of the gasket according the fifth exemplary embodiment may be formed in a way that all of the inner side end portion 610 and the outer side end portion 620 of the kammprofile 600 may have a convex curvature with a smooth edge.

Thus, the gasket according to the fifth exemplary embodiment of the present invention may achieve two kinds of effects in that the resistance property against the fluid pressure of the pipe path can be obtained and the strong sealing property can be maintained even under low seating stress owing to the O-ring members 110 provided in both sides of the kammprofile 600. Besides, there is an effect in that the damage to the first jacket 320 or the second jacket 310 caused by the external impact and the like can be avoided owing to the inner side end portion 610 and the outer side end portion 620 of the kammprofile 600.

Figure 17:
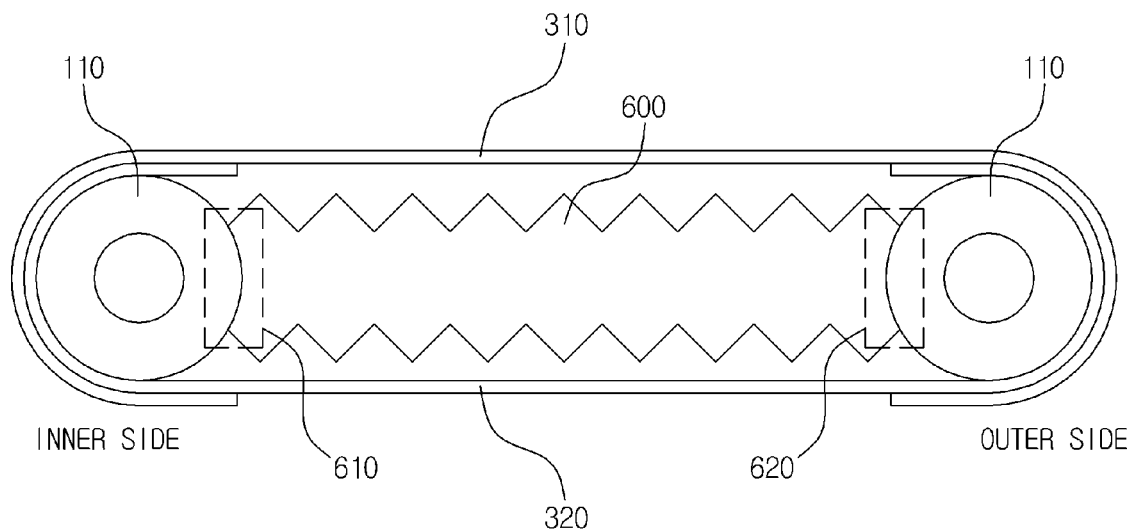
FIG. 17 is a view illustrating a gasket according to the sixth exemplary embodiment of the present invention.
Figure 18:
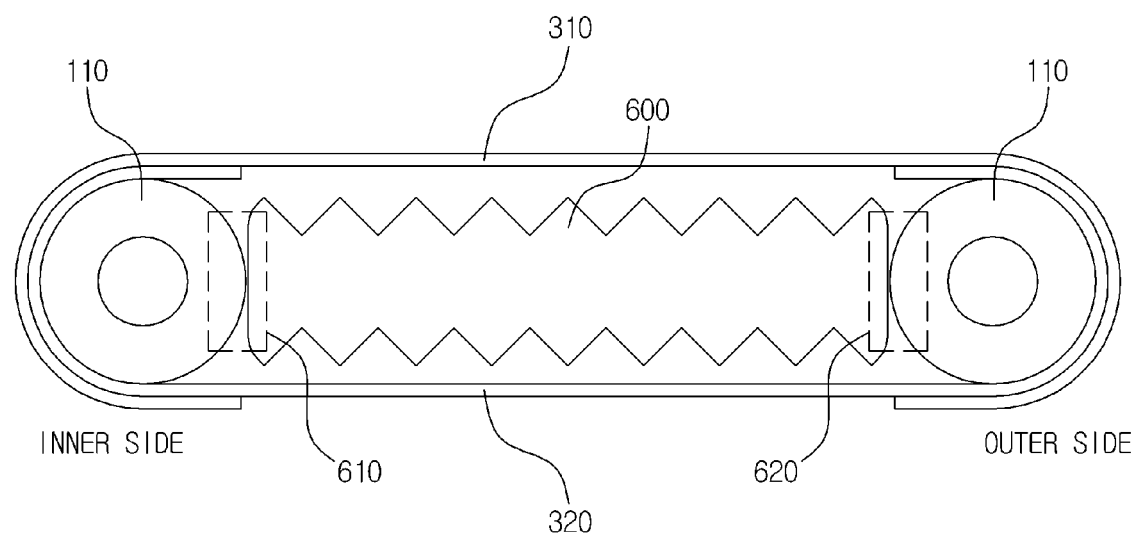
FIG. 18 is a view illustrating a modified form of the gasket according to the sixth exemplary embodiment of the present invention.

FIGS. 17 to 18 are views illustrating the gaskets and the modified forms thereof according to the sixth exemplary embodiment of the present invention.

The basic structure of the gasket according to the sixth exemplary embodiment of the present invention is similar to that of the gasket according to the fifth exemplary embodiment, however, there is a difference in that the first jacket 320 is bended upward direction of the gasket so as to encase the O-ring members 110 provided in the outer side and the inner side of the kammprofile.

The gasket according to the sixth exemplary embodiment of the present invention has an effect that since the inner side and the outer side of the gasket are doubly protected by the first jacket 320 and the second jacket 310, a gasket which is more strong against external pressure and less likely to be damaged can be provided.

Figure 19:
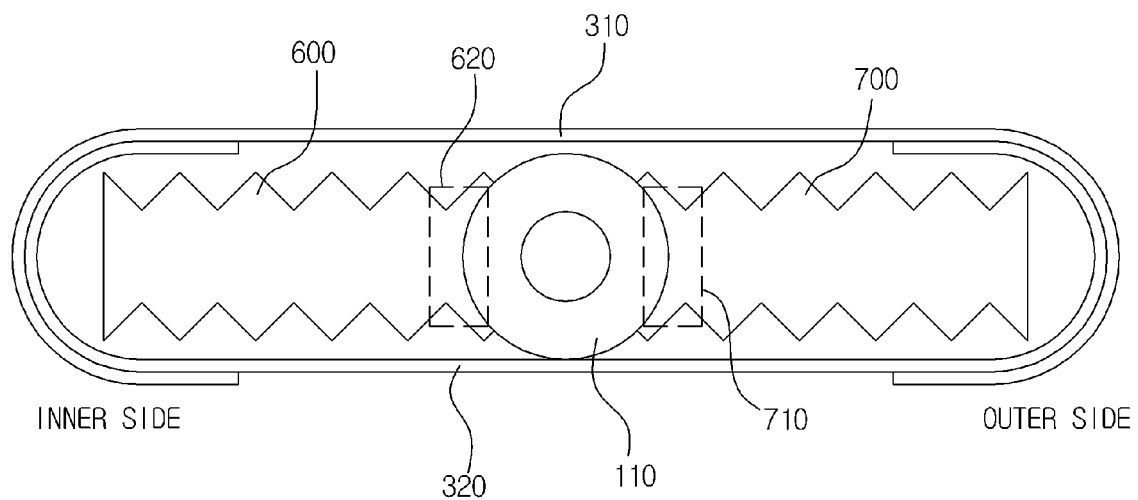
FIG. 19 is a view illustrating a gasket according to the seventh exemplary embodiment of the present invention.
Figure 20:
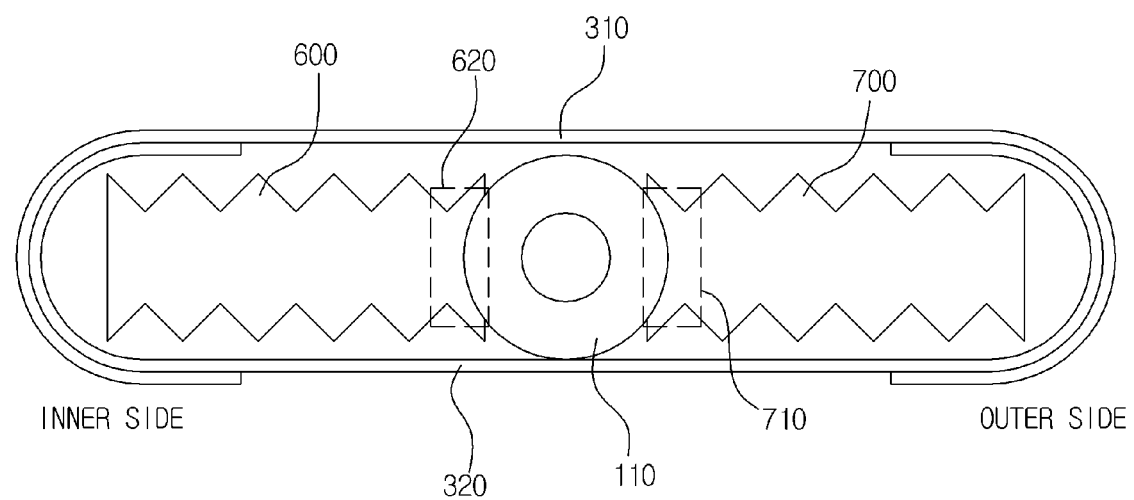
FIG. 20 is a view illustrating a modified form of the gasket according to the seventh exemplary embodiment of the present invention.
Figure 21:
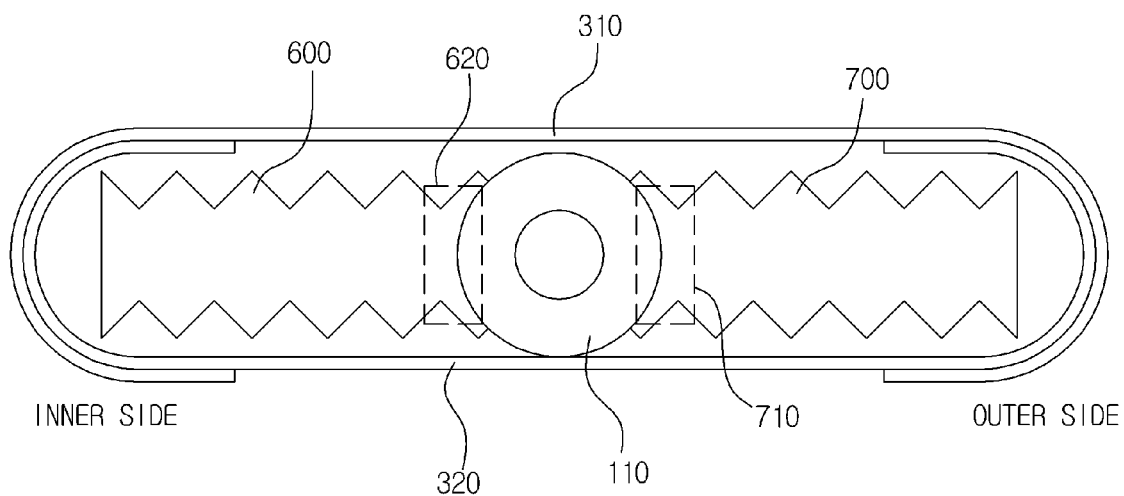
FIG. 21 is a view illustrating a modified form of the gasket according to the seventh exemplary embodiment of the present invention.

FIGS. 19 to 21 are views illustrating the gaskets and the modified forms thereof according to the seventh exemplary embodiment of the present invention.

A gasket according to the seventh exemplary embodiment may comprise an O-ring member 110 disposed in the center inside the gasket, a kammprofile 600 provided towards the inner side with respect to the O-ring 110, an outer side kammprofile 700 provided towards the outer side with respect to the O-ring 110, a first jacket 320, and a second jacket 310. In here, the kammprofile 600 and the outer side kammprofile 700 are practically same and the terms (names) are merely to distinguish kammprofiles disposed at both sides with respect to the O-ring member 110, and it should be noted that they are not referring to different ones but used for the convenience of distinguishing them in the description of the present invention.

In the kammprofile 600 located in the inner side portion of the gasket according to the seventh exemplary embodiment of the present invention an outer side end portion 620 may be formed having a concave curvature for a tight contact with the O-ring member 110, and a second inner side end portion 710 may also be formed in the outer side kammprofile 700 for a tight contact with the O-ring member 110. The shape of such outer side end portion 620 and the second inner side end portion 710 may be formed in various shapes as can be checked in FIGS. 19 to 21.

The O-ring member 110 disposed in the center inside the gasket, the kammprofile 600 provided towards the inner side with respect to the O-ring 110, and the outer side kammprofile 700 provided towards the outer side with respect to the O-ring 110 may be surrounded and accommodated inside the first jacket 320. The second jacket 310 may be bended so as to encase the O-ring member 110, the kammprofile 600, the outer side kammprofile 700, and the first jacket 320 from the upper side of the gasket.

According to the gasket according to the seventh exemplary embodiment of the present invention, there is an effect in that the applied pressure can be uniformly distributed through the O-ring member located in the center of the gasket, and at the same time a better sealing property can be achieved by concentrating the weight of the fastening bolt on the peaks of the sawtooth-like member even under low seating stress.

Figure 22:
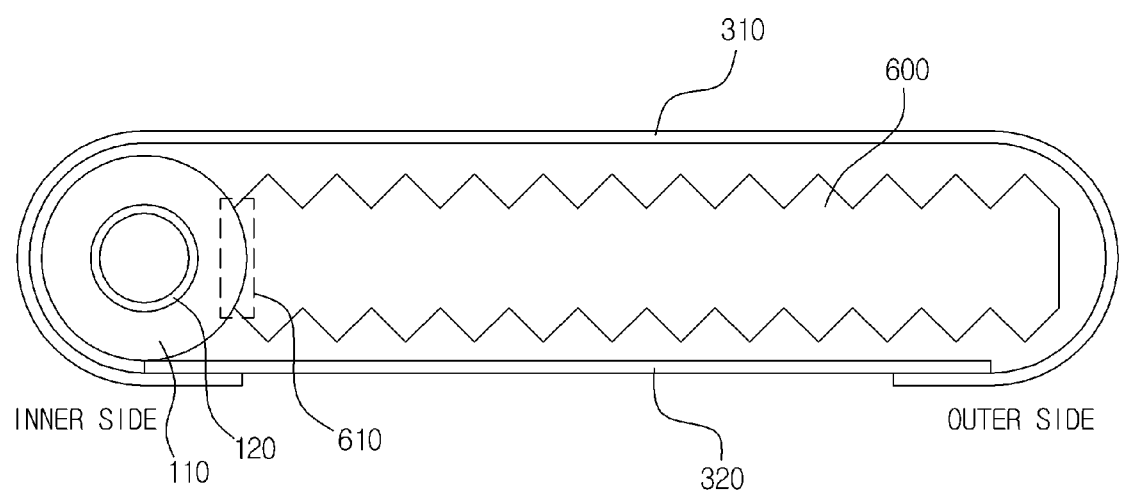
FIG. 22 is a view illustrating a gasket according to the eighth exemplary embodiment of the present invention.
Figure 23:
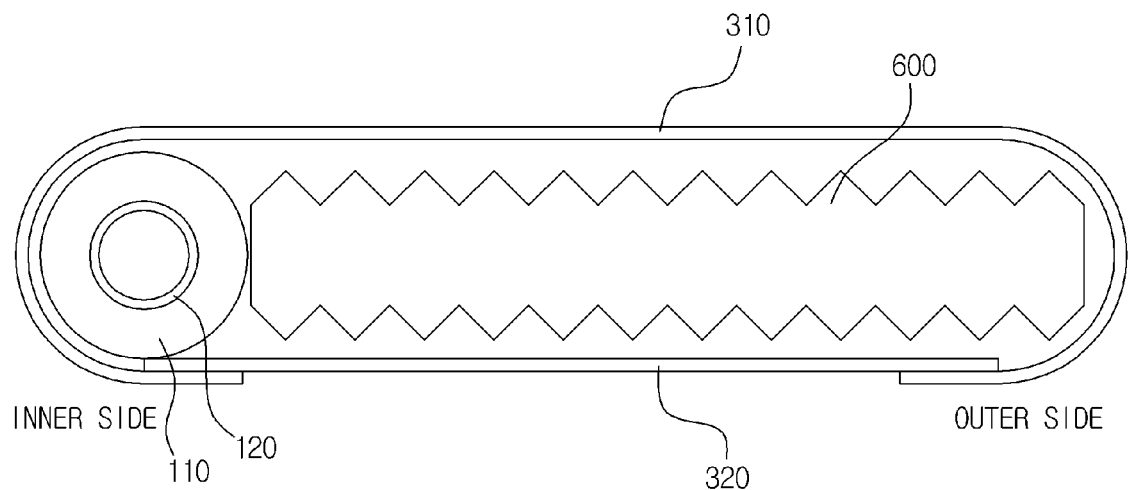
FIG. 23 is a view illustrating a modified form of the gasket according to the eighth exemplary embodiment of the present invention.
Figure 24:
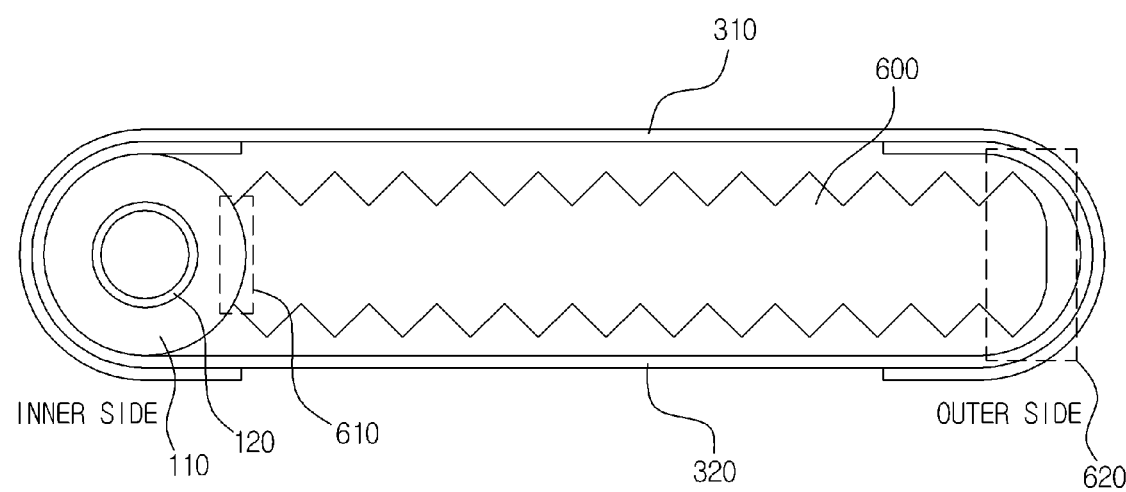
FIG. 24 is a view illustrating a gasket according to the ninth exemplary embodiment of the present invention.
Figure 25:
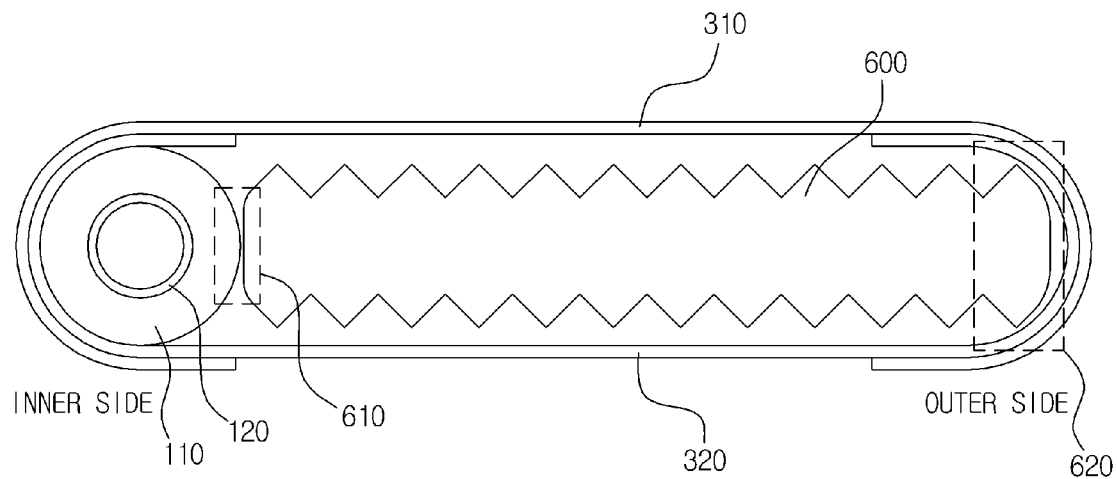
FIG. 25 is a view illustrating a modified form of the gasket according to the ninth exemplary embodiment of the present invention.
Figure 26:
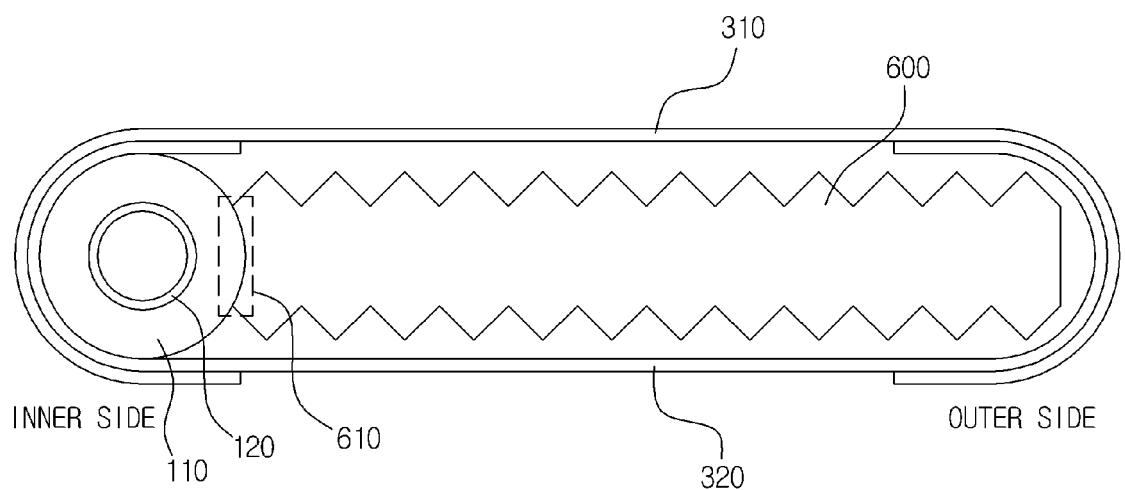
FIG. 26 is a view illustrating a modified form of the gasket according to the ninth exemplary embodiment of the present invention.
Figure 27:
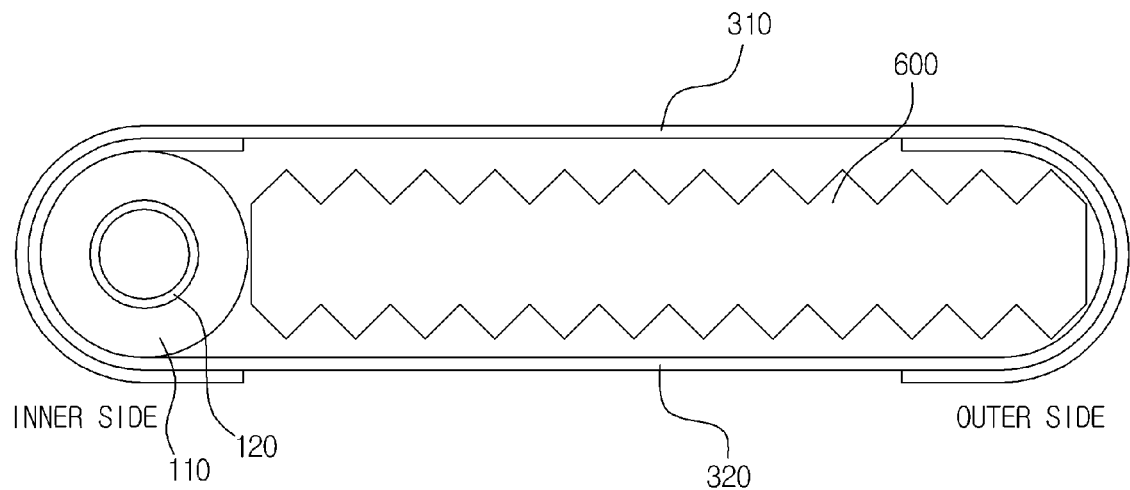
FIG. 27 is a view illustrating a modified form of the gasket according to the ninth exemplary embodiment of the present invention.
Figure 28:
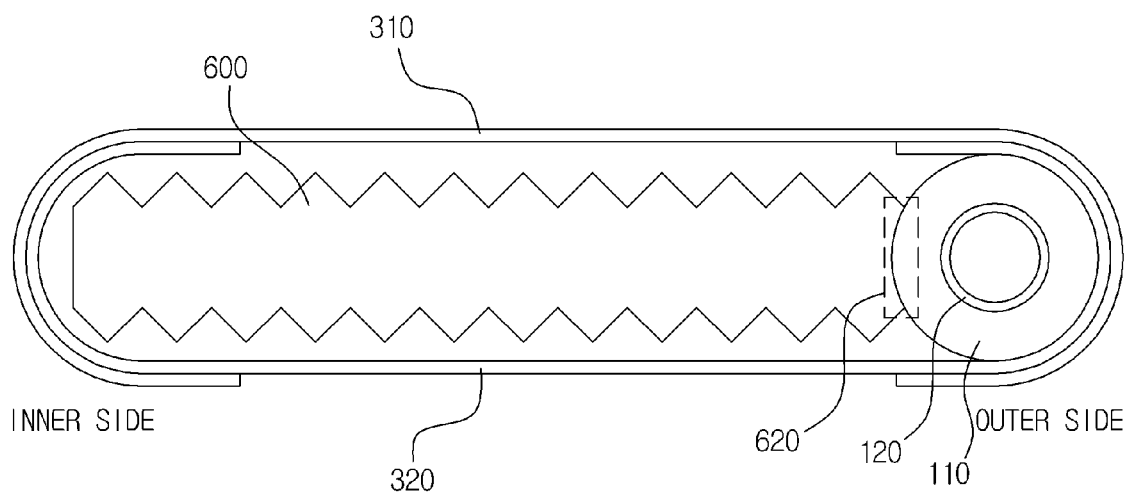
FIG. 28 is a view illustrating a gasket according to the tenth exemplary embodiment of the present invention.
Figure 29:
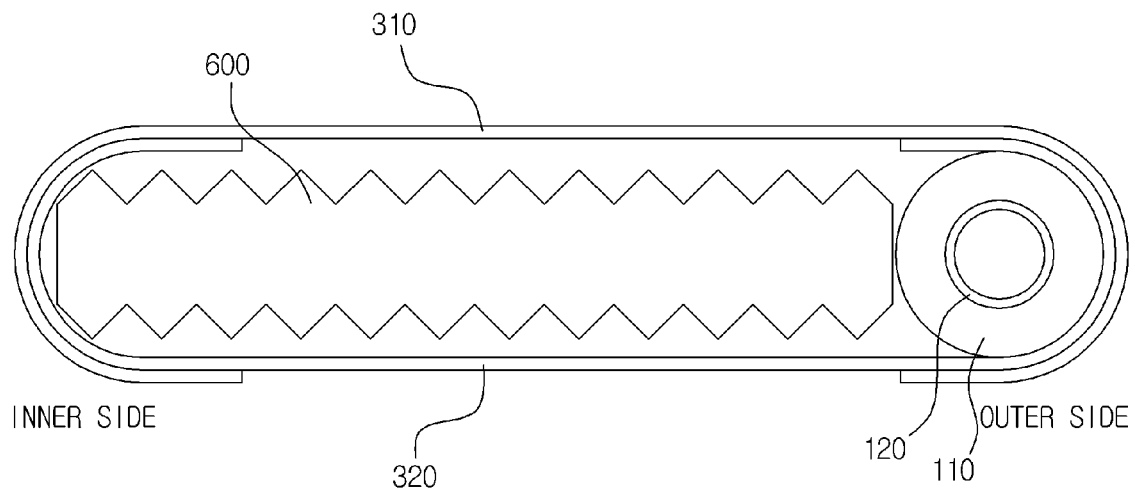
FIG. 29 is a view illustrating a modified form of the gasket according to the tenth exemplary embodiment of the present invention.
Figure 30:
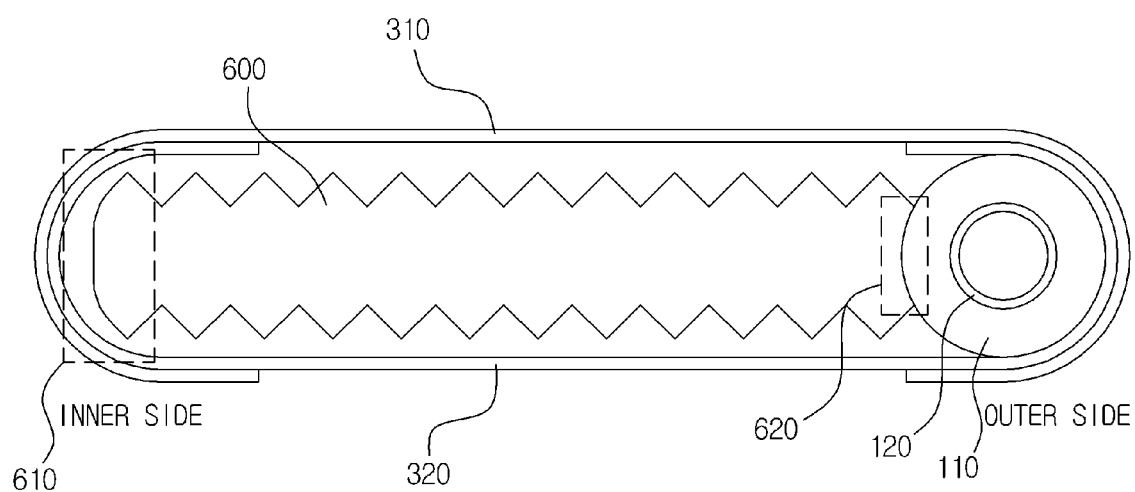
FIG. 30 is a view illustrating a modified form of the gasket according to the tenth exemplary embodiment of the present invention.
Figure 31:
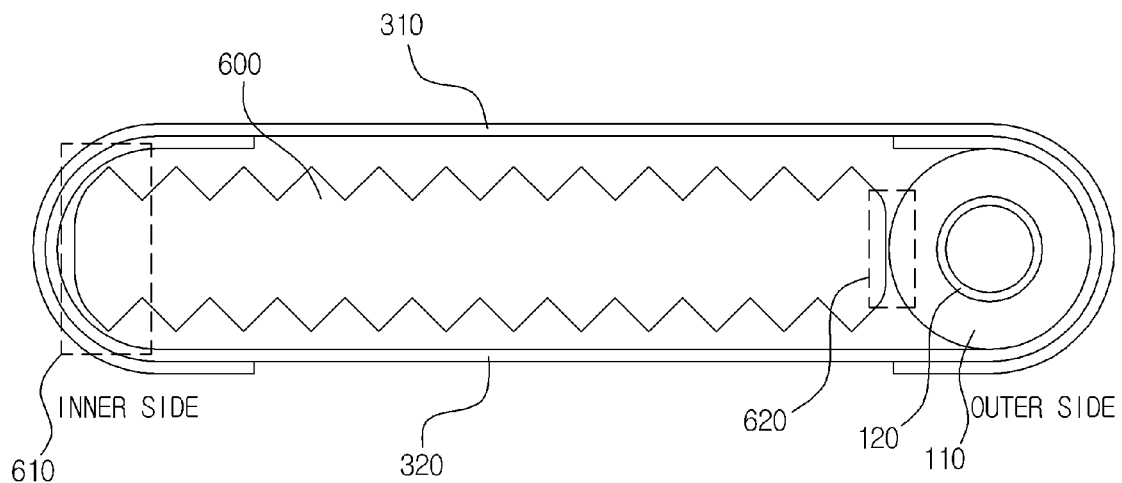
FIG. 31 is a view illustrating a modified form of the gasket according to the tenth exemplary embodiment of the present invention.

FIGS. 22 to 23 are views illustrating the gaskets and the modified forms thereof according to the eighth exemplary embodiment of the present invention.

Although the gasket according to the eighth exemplary embodiment of the present invention is similar to the gasket according to the first exemplary embodiment of the present invention in the aspects of the structure, there is a difference in that a spring 120 is provided inside the O-ring member 110. A flat coil spring may be adopted as such spring 120.

Owing to the spring 120 adopted inside the O-ring member 110, the gasket according to the eighth exemplary embodiment has an effect in that the restoring force of the gasket is achieved, and at the same time, the lifetime of the gasket can be extended by equally distributing the pressure applied from the outside.

Besides, as previously reviewed, when the inner side end portion 610 of the kammprofile 600 has a concave portion having a similar radius of curvature to that of the O-ring member 110 so as to be in tight contact with the O-ring member 110, an effect of preventing damages to the O-ring member 110 caused by the external impact or friction may also be provided.

FIGS. 24 to 27 are views illustrating the gaskets and the modified forms thereof according to the ninth exemplary embodiment of the present invention.

Although the gasket according to the ninth exemplary embodiment of the present invention is similar to the gasket according to the second exemplary embodiment of the present invention in the basic structure thereof, there is a difference in that a spring 120 is further provided inside the O-ring member 110. Owing to such structure, as previously reviewed, there is an effect in that the lifetime of the gasket can be extended by distributing the pressure being applied from the outside.

In addition, the inner side end portion 610 or the outer side end portion 620 of the kammprofile 600 may also be formed to have a concave curvature or a convex curvature having a smooth edge so as to avoid the damages to the first jacket 320 and the second jacket 310.

FIGS. 28 to 31 are views illustrating the gaskets and the modified forms thereof according to the tenth exemplary embodiment of the present invention.

The gasket according to the tenth exemplary embodiment of the present invention is different to the gasket according to the third exemplary embodiment of the present invention in that a spring 120, especially a flat coil spring, is provided inside the O-ring member 110. The effect that can be achieved owing to such structure is same as previously reviewed.

Figure 32:
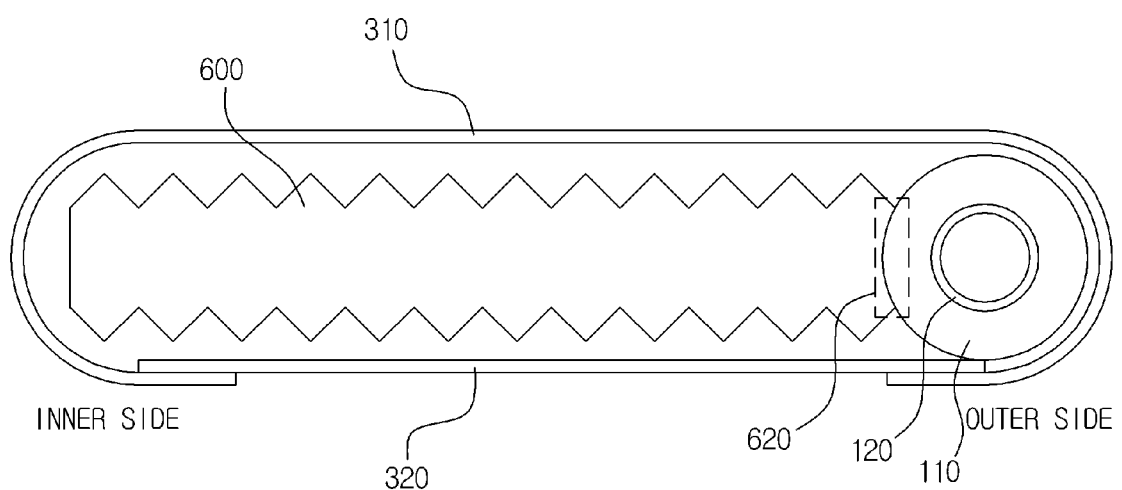
FIG. 32 is a view illustrating a gasket according to the eleventh exemplary embodiment of the present invention.
Figure 33:
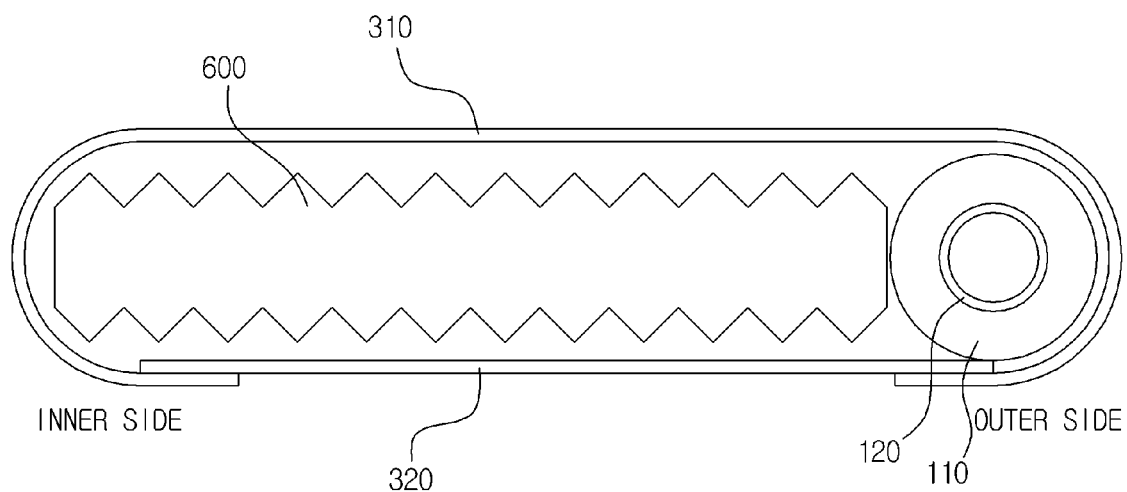
FIG. 33 is a view illustrating a modified form of the gasket according to the eleventh exemplary embodiment of the present invention.

FIGS. 32 to 33 are views illustrating the gaskets and the modified forms thereof according to the eleventh exemplary embodiment of the present invention.

The gasket according to the eleventh exemplary embodiment is same as the gasket according to the fourth exemplary embodiment except that a spring 120 is provided inside the O-ring member 110 thereof, so that a better restoring force and sealing property can be achieved owing to such spring 120.

Figure 34:
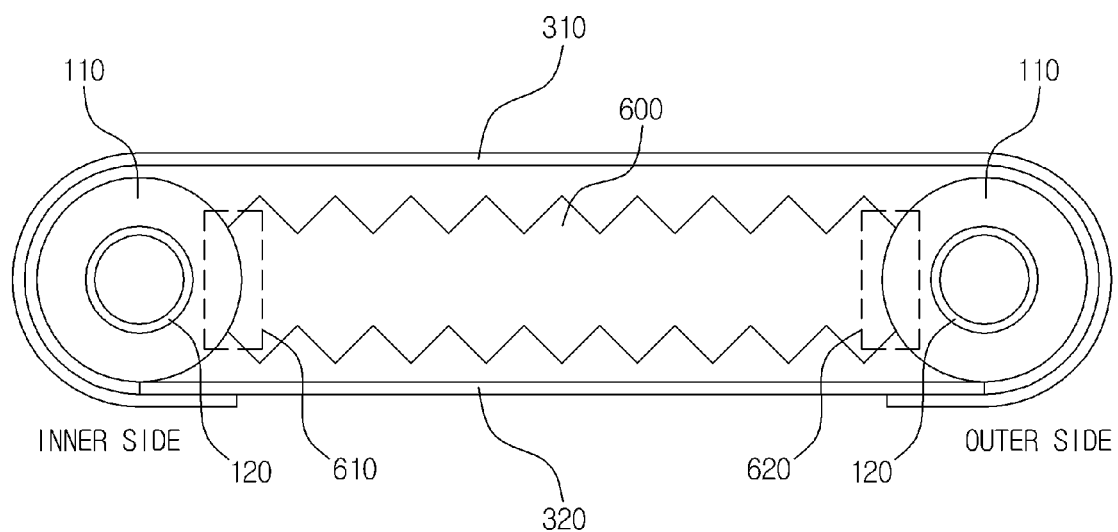
FIG. 34 is a view illustrating a gasket according to the twelfth exemplary embodiment of the present invention.
Figure 35:
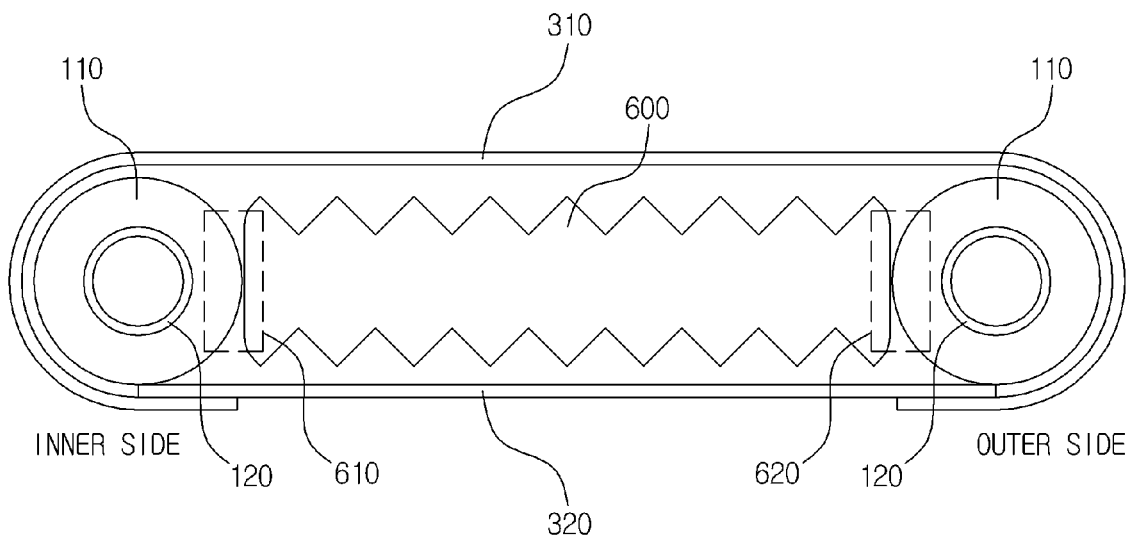
FIG. 35 is a view illustrating a modified form of the gasket according to the twelfth exemplary embodiment of the present invention.

FIGS. 34 to 35 are views illustrating the gaskets and the modified forms thereof according to the twelfth exemplary embodiment of the present invention.

The gasket according to the twelfth exemplary embodiment is characterized in that a flat coil type spring 120 is provided inside the O-ring member 110 of the gasket according to the fifth exemplary embodiment, so that a better restoring force and sealing property than those of the gasket according to the fifth exemplary embodiment can be achieved owing to such spring 120.

Figure 36:
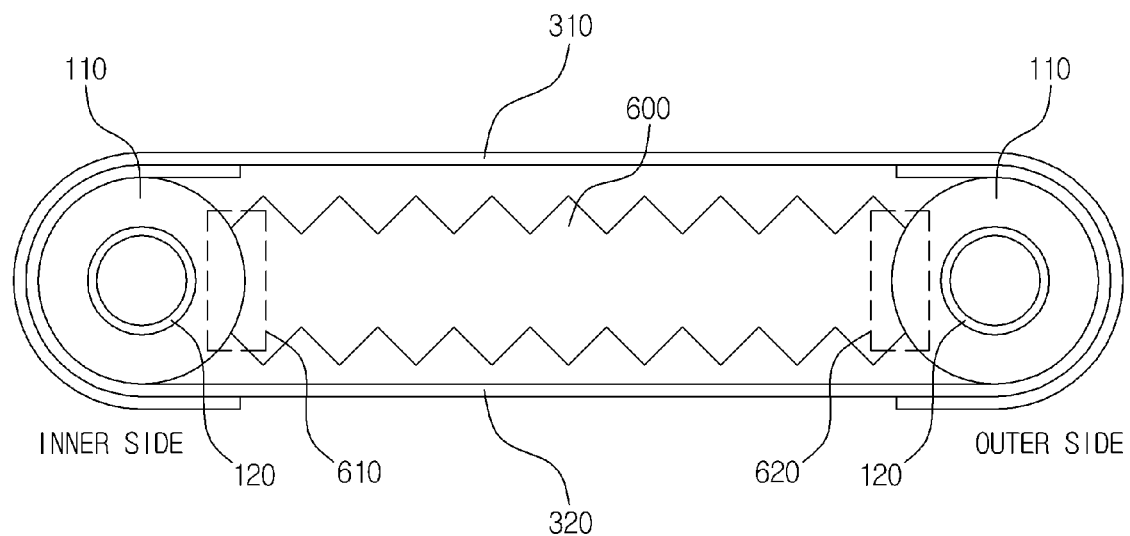
FIG. 36 is a view illustrating a gasket according to the thirteenth exemplary embodiment of the present invention.
Figure 37:
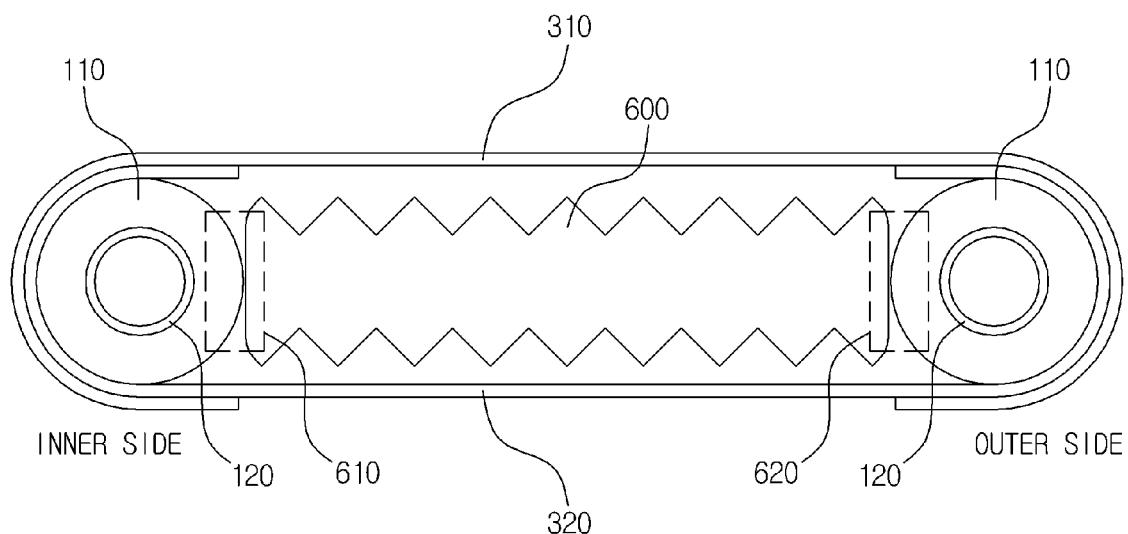
FIG. 37 is a view illustrating a modified form of the gasket according to the thirteenth exemplary embodiment of the present invention.

FIGS. 36 to 37 are views illustrating the gaskets and the modified forms thereof according to the thirteenth exemplary embodiment of the present invention.

The gasket according to the thirteenth exemplary embodiment is characterized in that a spring 120 is further provided inside the O-ring member 110 of the gasket according to the sixth exemplary embodiment, and the additional effect that can be achieved owing to such spring 120 is same as the one previously reviewed.

Figure 38:
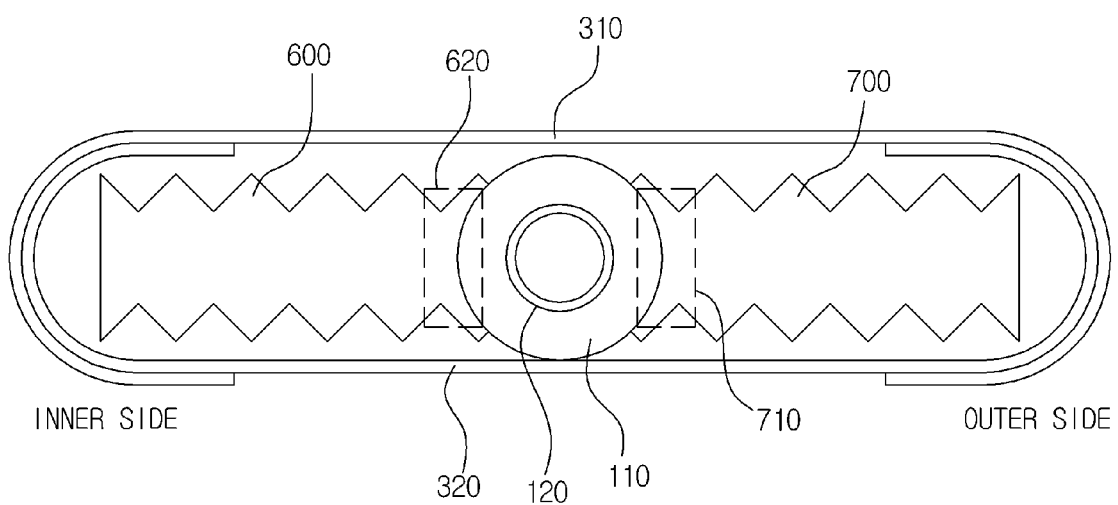
FIG. 38 is a view illustrating a gasket according to the fourteenth exemplary embodiment of the present invention.
Figure 39:
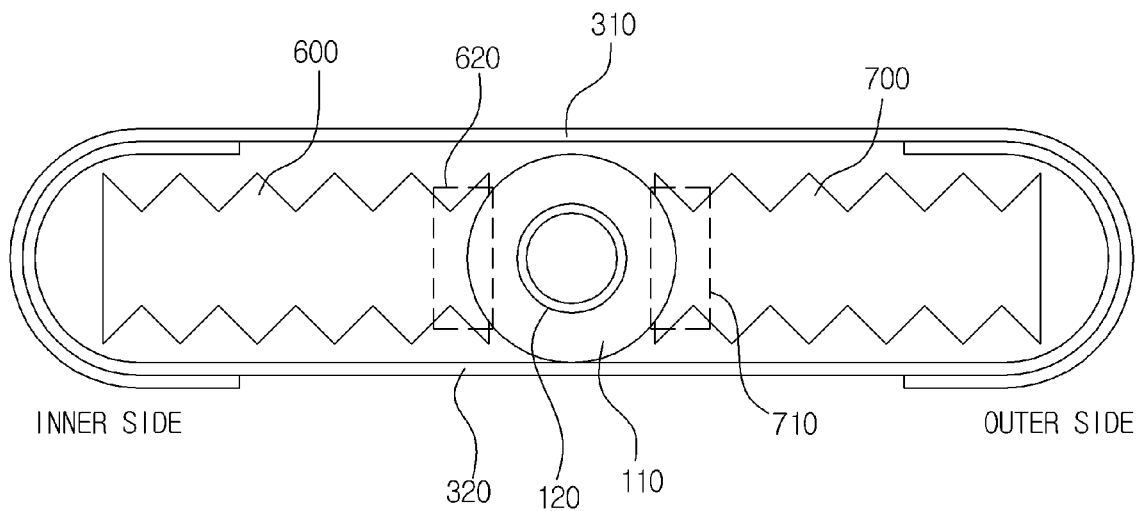
FIG. 39 is a view illustrating a modified form of the gasket according to the fourteenth exemplary embodiment of the present invention.
Figure 40:
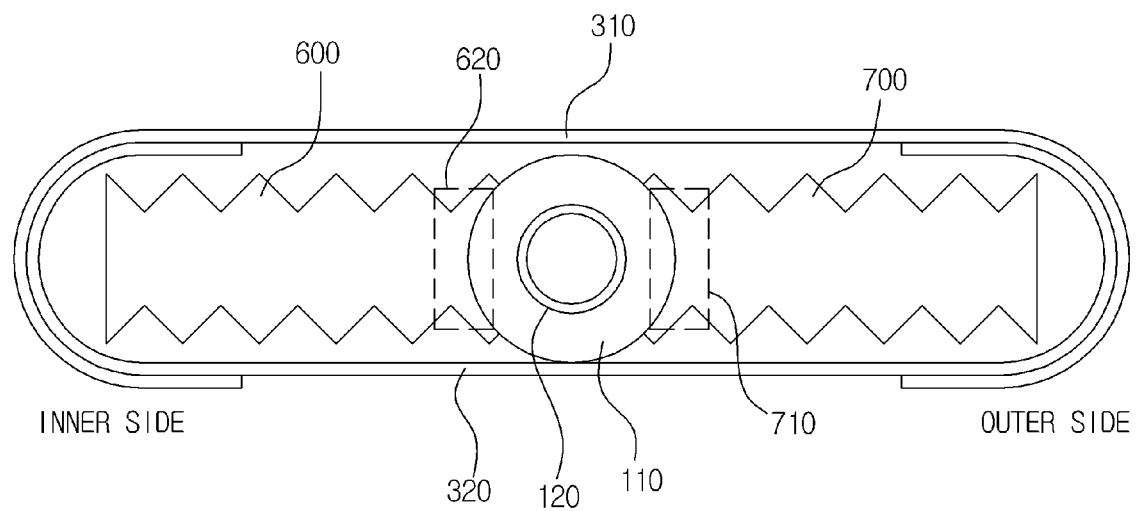
FIG. 40 is a view illustrating a modified form of the gasket according to the fourteenth exemplary embodiment of the present invention.

FIGS. 38 to 40 are views illustrating the gaskets and the modified forms thereof according to the fourteenth exemplary embodiment of the present invention.

The gasket according to the fourteenth exemplary embodiment is characterized in that a spring 120 is further provided inside the O-ring member 110 of the gasket according to the seventh exemplary embodiment in order to enhance the restoring force and the sealing property.

The FIGS. 41 to 71 illustrated hereinbelow are the gaskets wherein sealing layers 800 are further provided respectively on the first jacket 320 and the second jacket 310 in each of the exemplary embodiments of the gaskets previously reviewed, and such gaskets of the exemplary embodiments provide the effects of enhancing the sealing properties of the previously reviewed gaskets.

Figure 41:
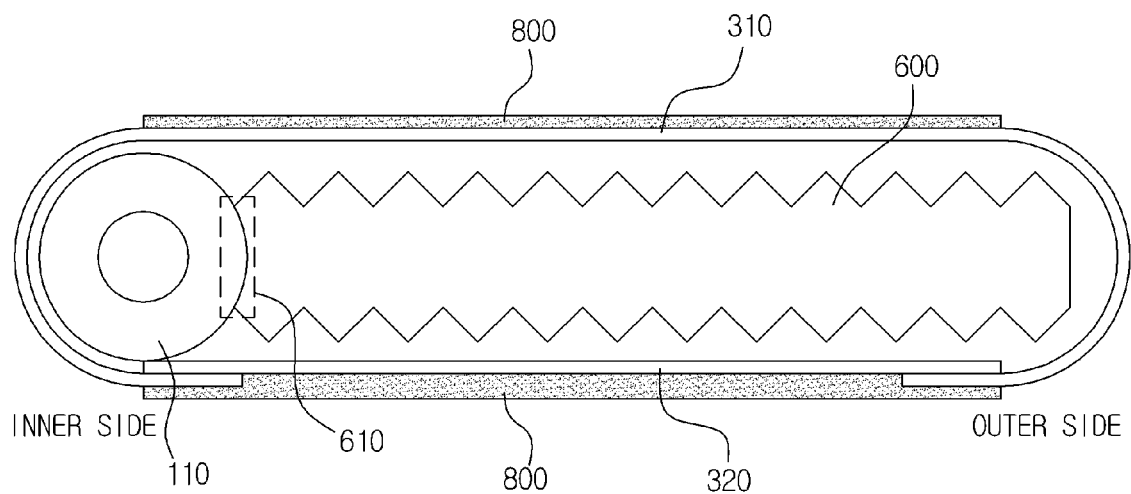
FIG. 41 is a view illustrating a gasket according to the fifteenth exemplary embodiment of the present invention.
Figure 42:
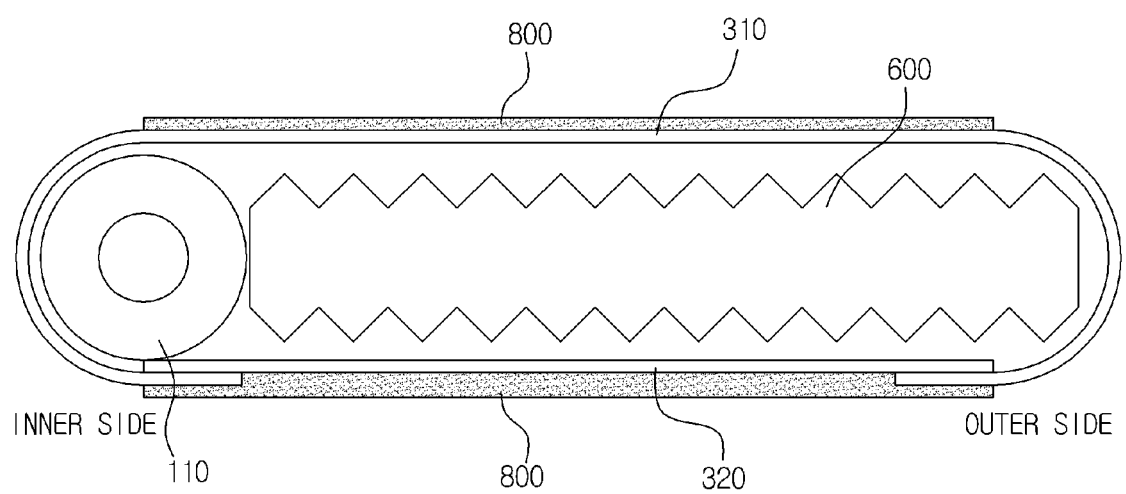
FIG. 42 is a view illustrating a modified form of the gasket according to the fifteenth exemplary embodiment of the present invention.
Figure 43:
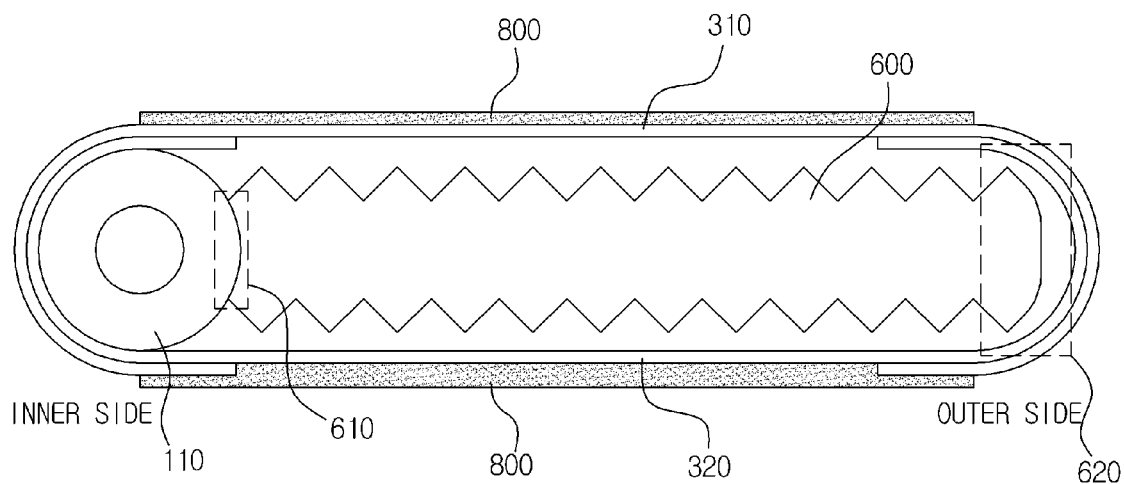
FIG. 43 is a view illustrating a gasket according to the sixteenth exemplary embodiment of the present invention.
Figure 44:
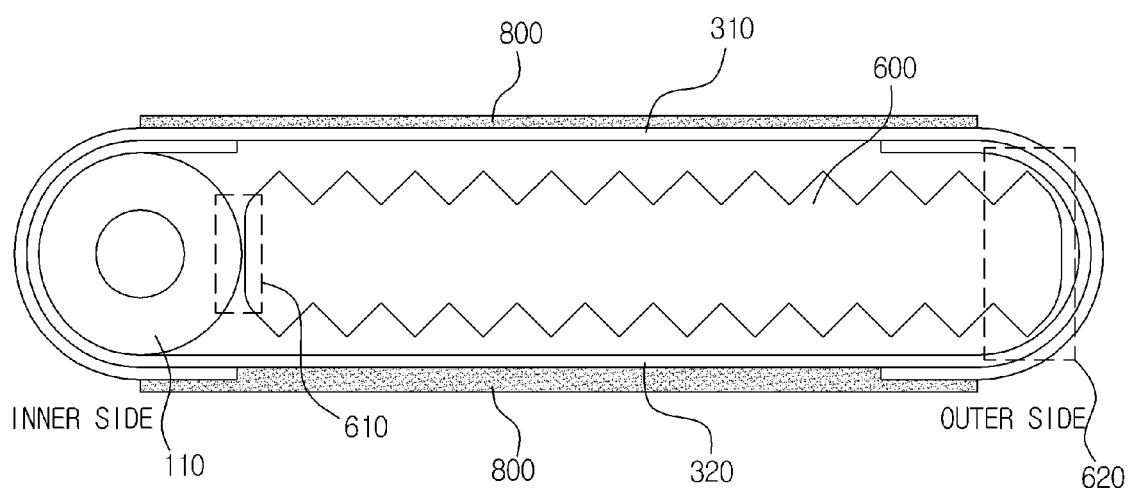
FIG. 44 is a view illustrating a modified form of the gasket according to the sixteenth exemplary embodiment of the present invention.
Figure 45:
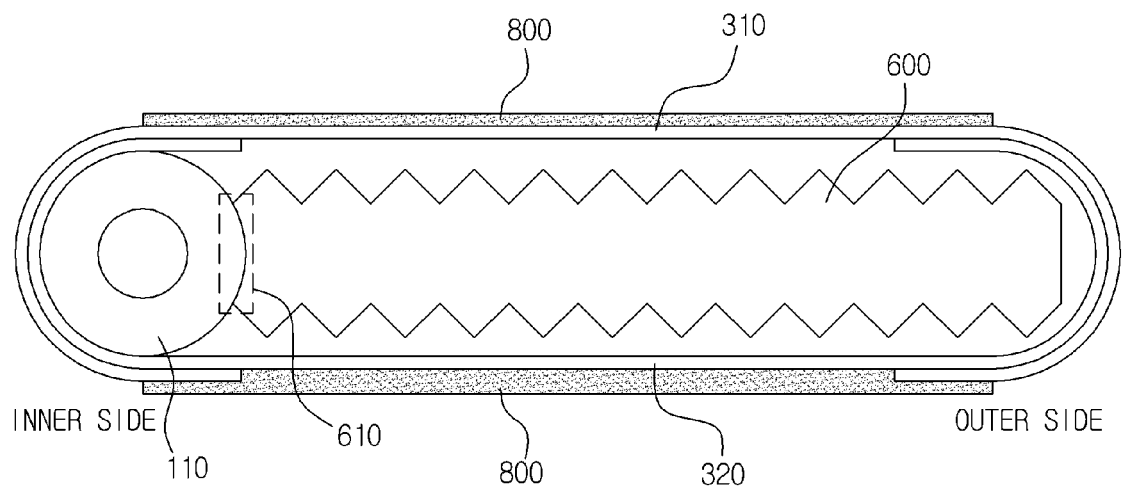
FIG. 45 is a view illustrating a modified form of the gasket according to the sixteenth exemplary embodiment of the present invention.
Figure 46:
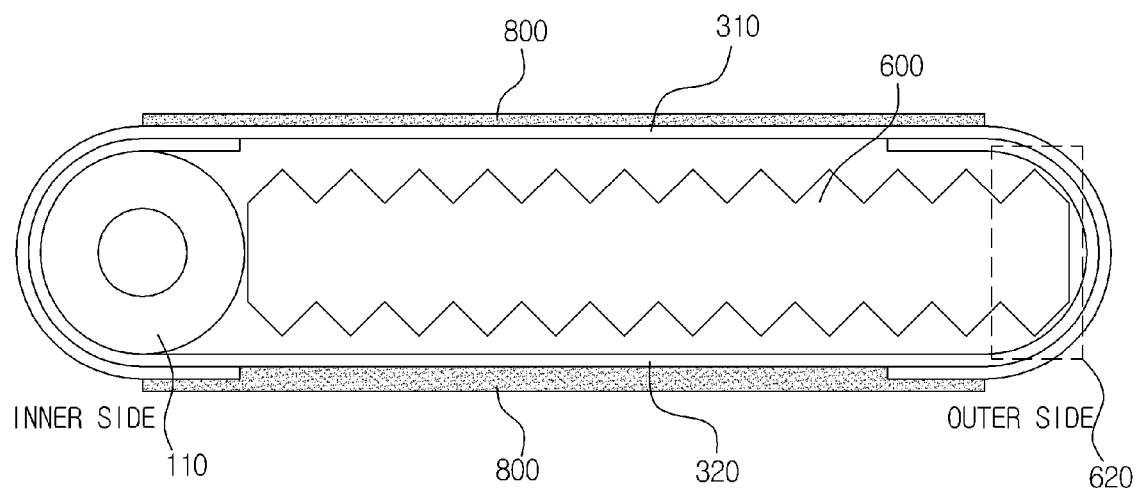
FIG. 46 is a view illustrating a modified form of the gasket according to the sixteenth exemplary embodiment of the present invention.
Figure 47:
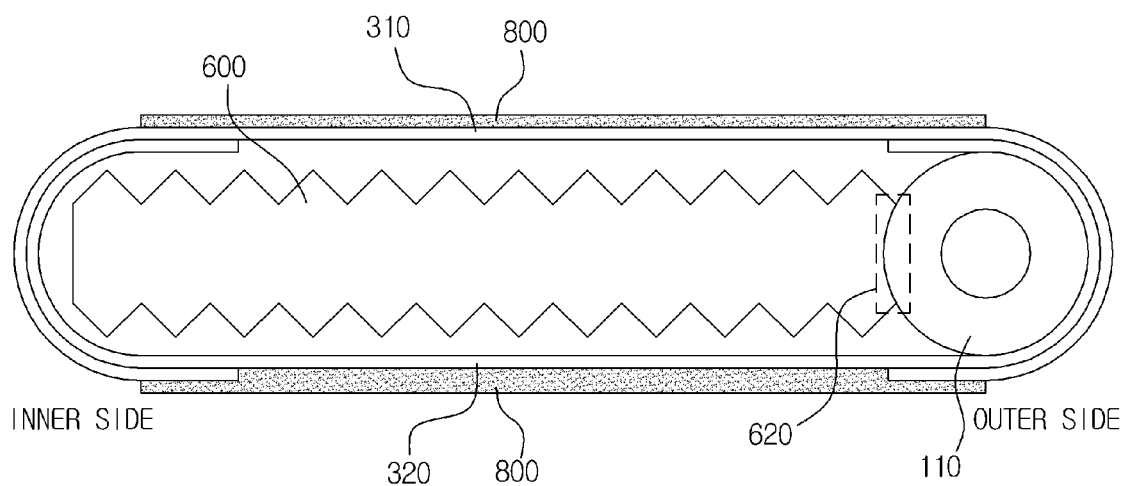
FIG. 47 is a view illustrating a gasket according to the seventeenth exemplary embodiment of the present invention.
Figure 48:
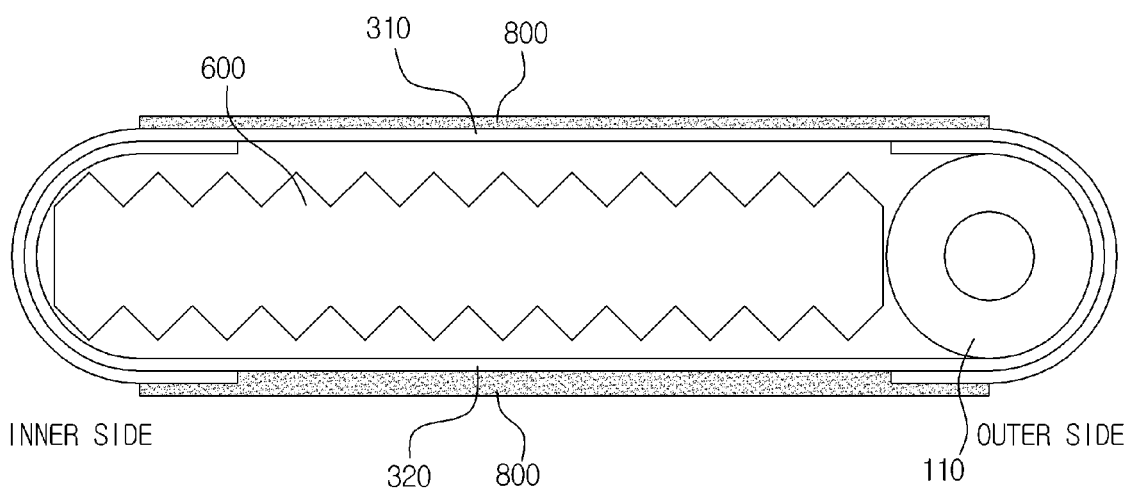
FIG. 48 is a view illustrating a modified form of the gasket according to the seventeenth exemplary embodiment of the present invention.
Figure 49:
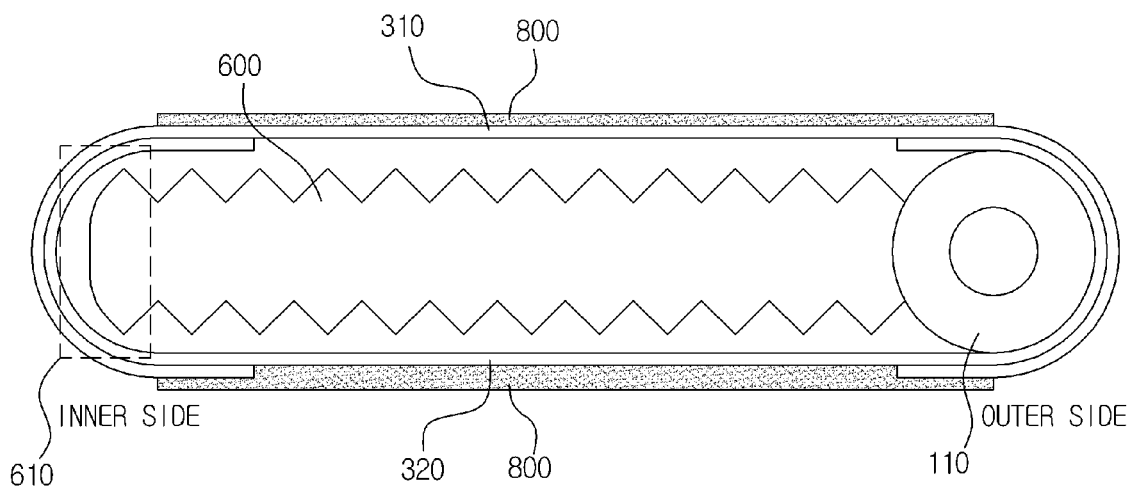
FIG. 49 is a view illustrating a modified form of the gasket according to the seventeenth exemplary embodiment of the present invention.
Figure 50:
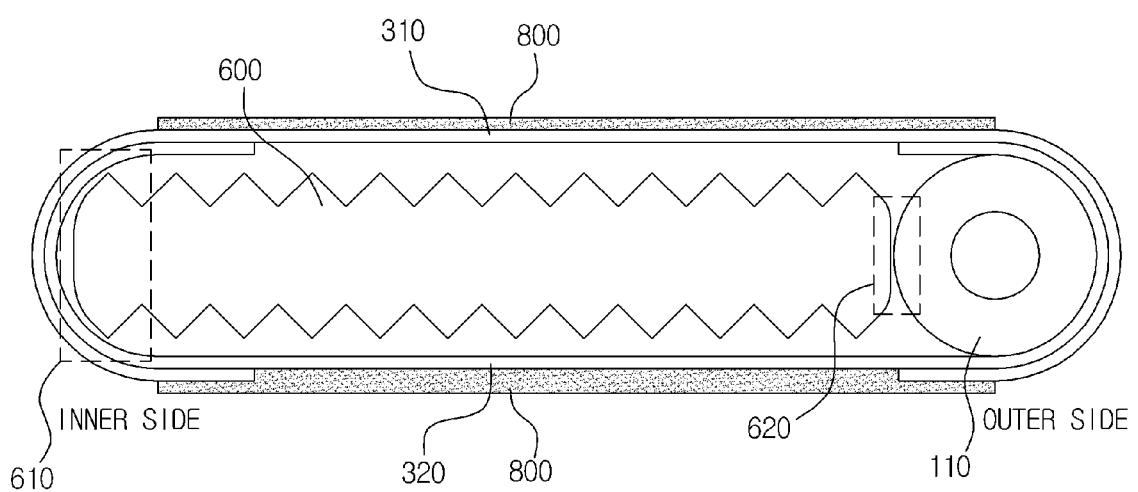
FIG. 50 is a view illustrating a modified form of the gasket according to the seventeenth exemplary embodiment of the present invention.

FIGS. 41 to 42 are views illustrating the gaskets and the modified forms thereof according to the fifteenth exemplary embodiment of the present invention.

The gasket according to the fifteenth exemplary embodiment of the present invention is characterized in that sealing layers 800 are further provided on the first jacket 320 and the second jacket 310 of the gasket according to the first exemplary embodiment. Such sealing layers 800 may be formed with any one of carbon, mica, polytetrafluoroethylene (PTFE), silver, atomized stainless steel, and ceramics or a combination of these elements.

Owing to such sealing layers 800, the gasket according to the fifteenth exemplary embodiment of the present invention provides an effect that is provided by the gasket according to the first exemplary embodiment, and at the same time, a more enhanced sealing property is provided by maintaining the tight contact of the joint surface between the gasket and the flanges more stably.

FIGS. 43 to 46 are views illustrating the gaskets and the modified forms thereof according to the sixteenth exemplary embodiment of the present invention.

The gasket according to the sixteenth exemplary embodiment of the present invention is characterized in that sealing layers 800 are further provided on the first jacket 320 and the second jacket 310 of the gasket according to the second exemplary embodiment. and at the same time, a more enhanced sealing property is provided by maintaining the tight contact of the joint surface between the gasket and the flanges more stably.

FIGS. 47 to 50 are views illustrating the gaskets and the modified forms thereof according to the seventeenth exemplary embodiment of the present invention.

The gasket according to the seventeenth exemplary embodiment of the present invention is also characterized in that sealing layers 800 are further provided on the first jacket 320 and the second jacket 310 of the gasket according to the third exemplary embodiment.

Figure 51:
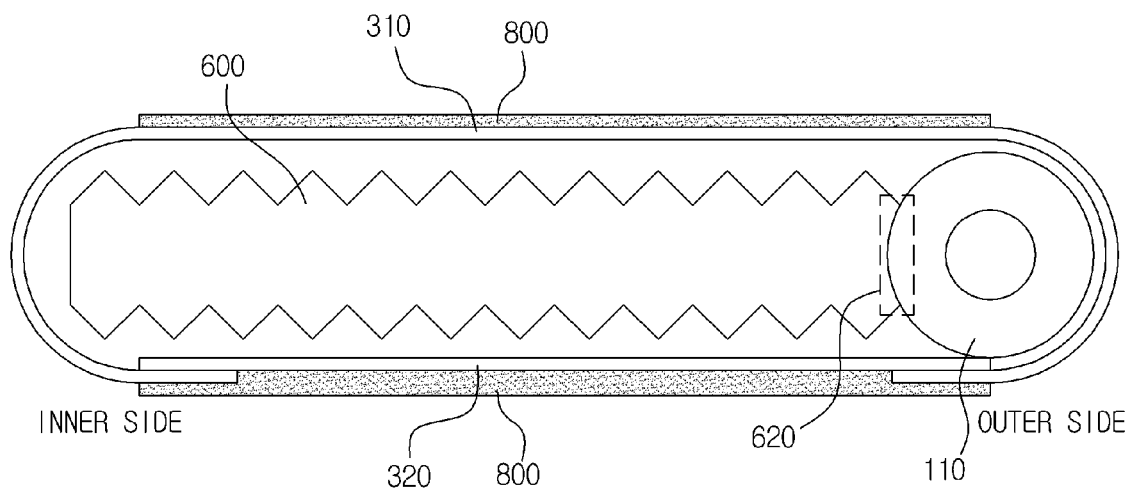
FIG. 51 is a view illustrating a gasket according to the eighteenth exemplary embodiment of the present invention.
Figure 52:
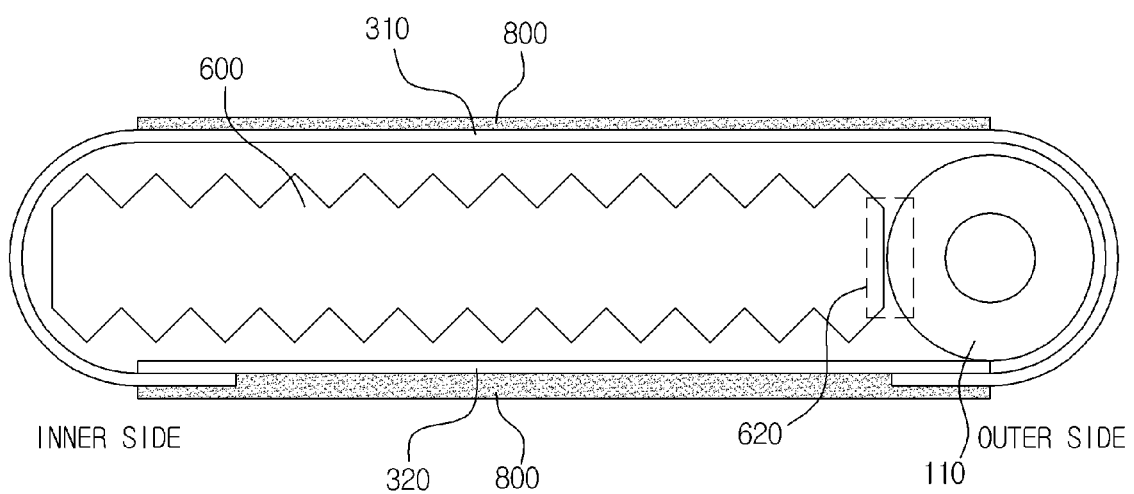
FIG. 52 is a view illustrating a modified form of the gasket according to the eighteenth exemplary embodiment of the present invention.

FIGS. 51 to 52 are views illustrating the gaskets and the modified forms thereof according to the eighteenth exemplary embodiment of the present invention.

The gasket according to the eighteenth exemplary embodiment of the present invention is characterized in that sealing layers 800 are further provided on the first jacket 320 and the second jacket 310 of the gasket according to the fourth exemplary embodiment.

Figure 53:
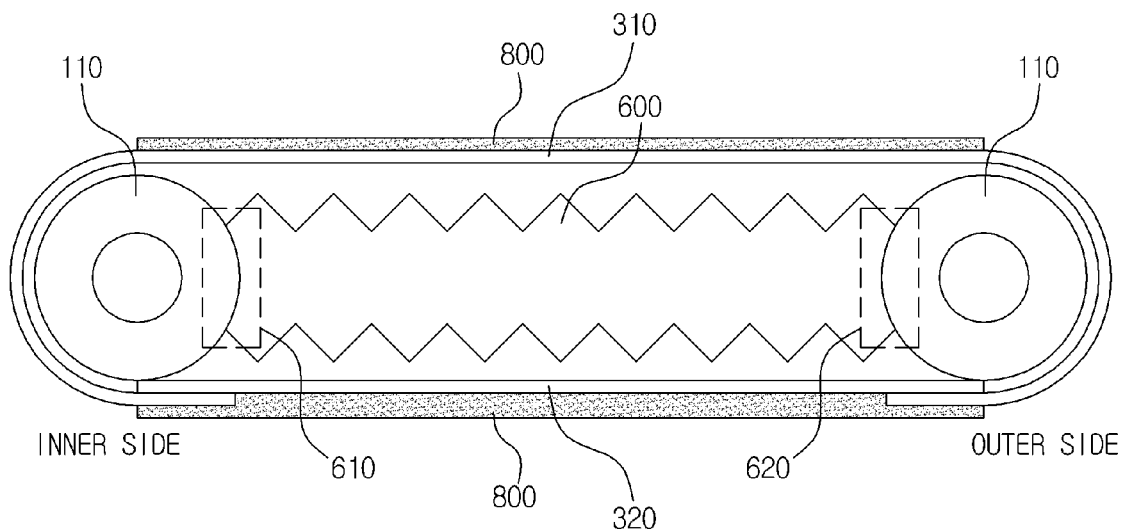
FIG. 53 is a view illustrating a gasket according to the nineteenth exemplary embodiment of the present invention.
Figure 54:
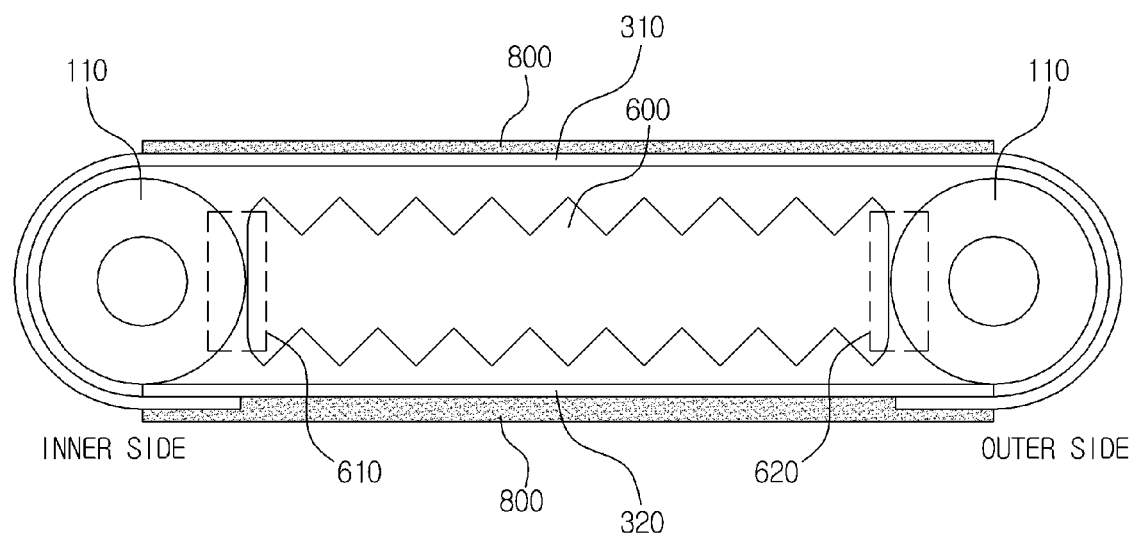
FIG. 54 is a view illustrating a modified form of the gasket according to the nineteenth exemplary embodiment of the present invention.

FIGS. 53 to 54 are views illustrating the gaskets and the modified forms thereof according to the nineteenth exemplary embodiment of the present invention.

The gasket according to the nineteenth exemplary embodiment of the present invention is also characterized in that sealing layers 800 are further provided on the outer surface of the gasket according to the fifth exemplary embodiment, and thus, there is an effect in that a more stable sealing effect is provided than the gasket according to the fifth exemplary embodiment.

Figure 55:
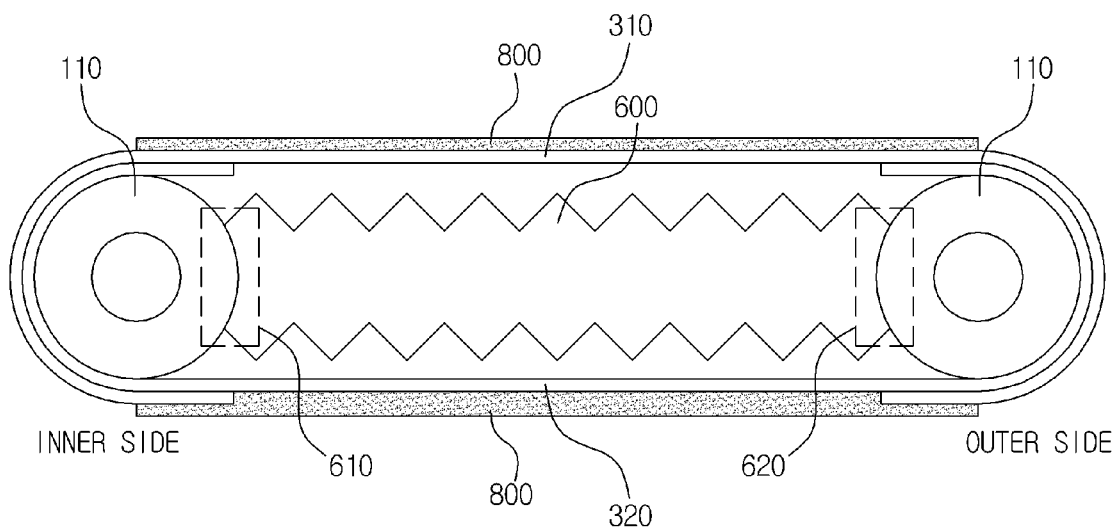
FIG. 55 is a view illustrating a gasket according to the twentieth exemplary embodiment of the present invention.
Figure 56:
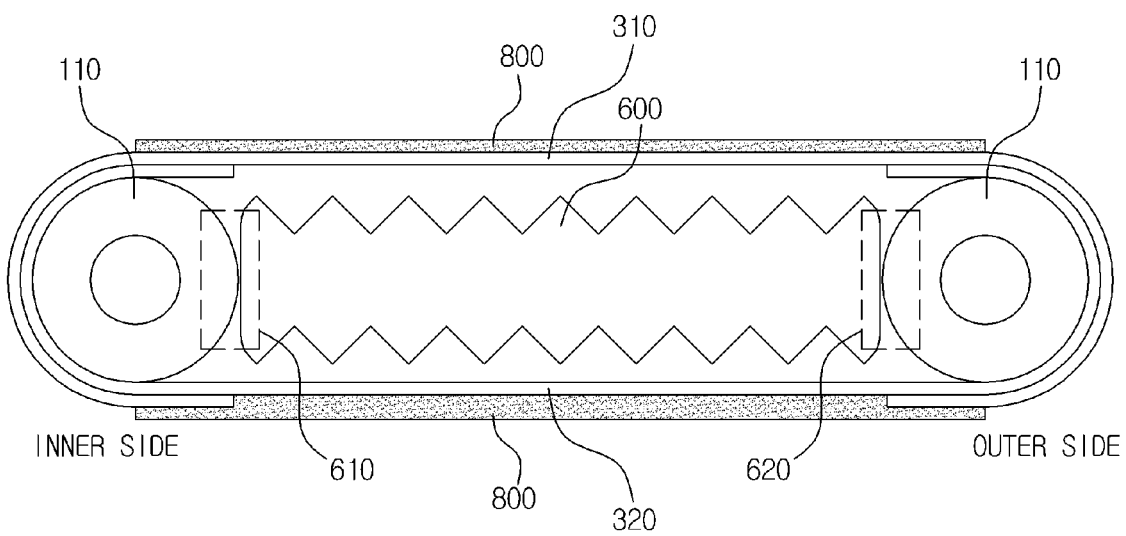
FIG. 56 is a view illustrating a modified form of the gasket according to the twentieth exemplary embodiment of the present invention.

FIGS. 55 to 56 are views illustrating the gaskets and the modified forms thereof according to the twentieth exemplary embodiment of the present invention.

The gasket according to the twentieth exemplary embodiment of the present invention is an invention that is characterized in that sealing layers 800 are further provided on the first jacket 320 and the second jacket 310 of the gasket according to the sixth exemplary embodiment.

Figure 57:
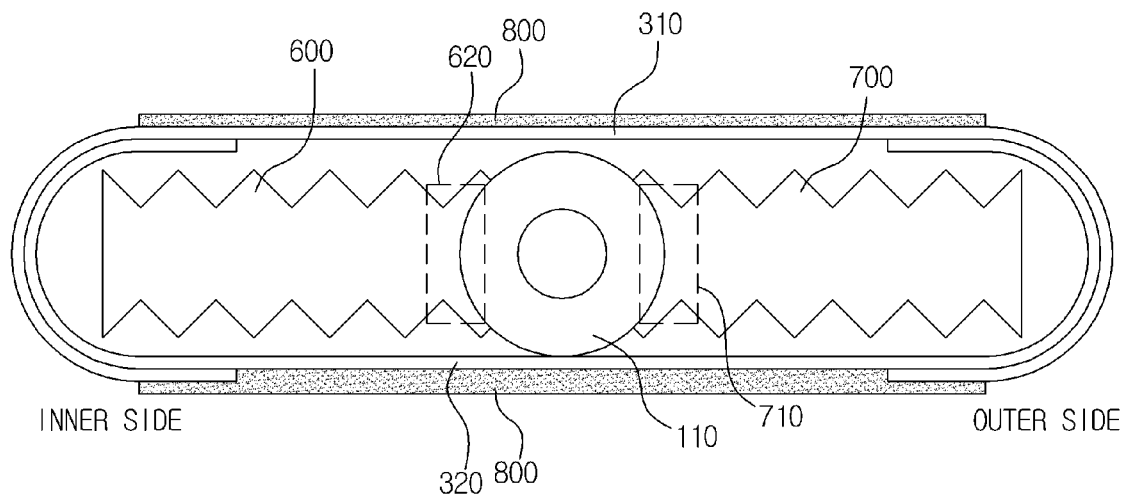
FIG. 57 is a view illustrating a gasket according to the twenty-first exemplary embodiment of the present invention.
Figure 58:
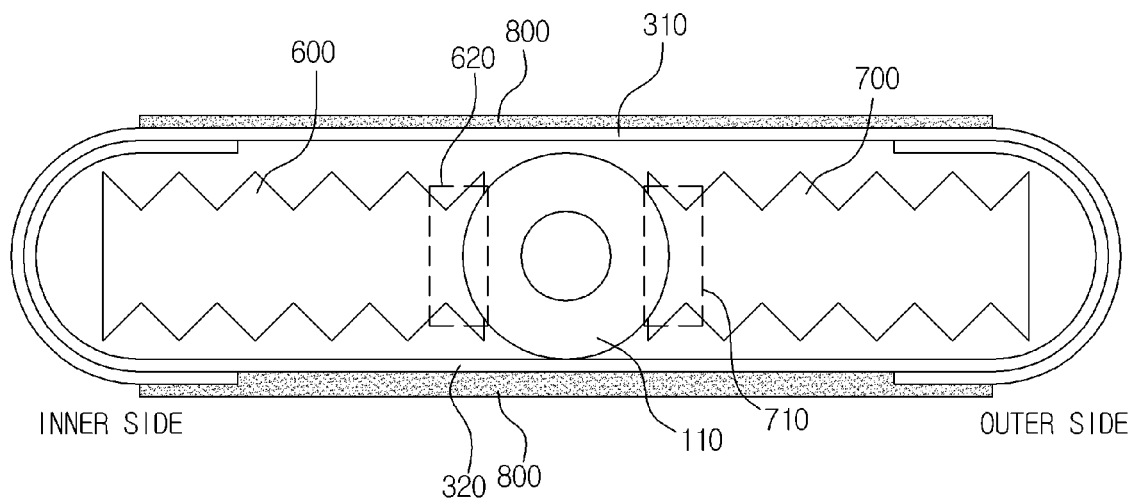
FIG. 58 is a view illustrating a modified form of the gasket according to the twenty-first exemplary embodiment of the present invention.
Figure 59:
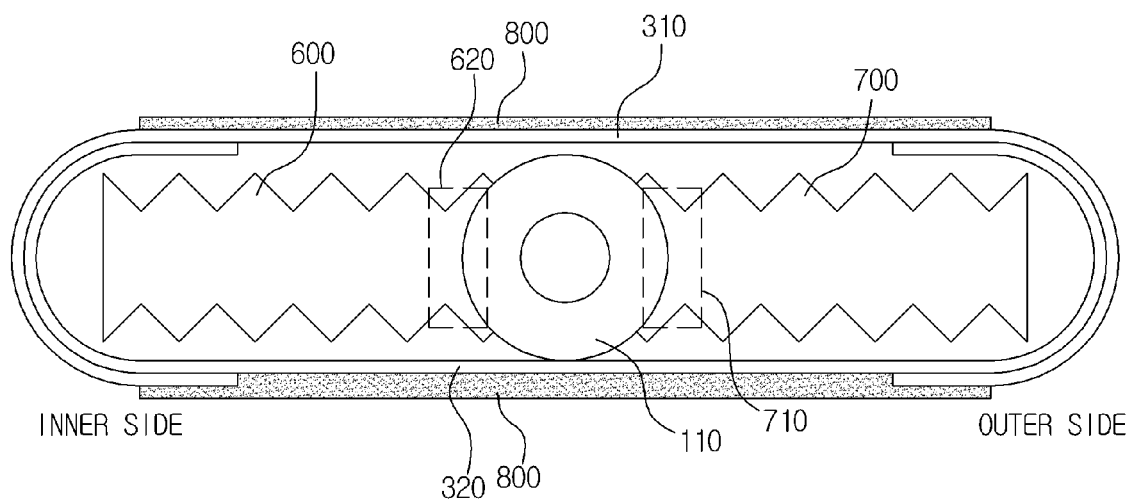
FIG. 59 is a view illustrating a modified form of the gasket according to the twenty-first exemplary embodiment of the present invention.

FIGS. 57 to 59 are views illustrating the gaskets and the modified forms thereof according to the twenty-first exemplary embodiment of the present invention.

The gasket according to the twenty-first exemplary embodiment of the present invention is an invention that is characterized in that sealing layers 800 are further provided on the first jacket 320 and the second jacket 310 of the gasket according to the seventh exemplary embodiment. The effect that can be achieved owing to this is the same as previously reviewed.

Figure 60:
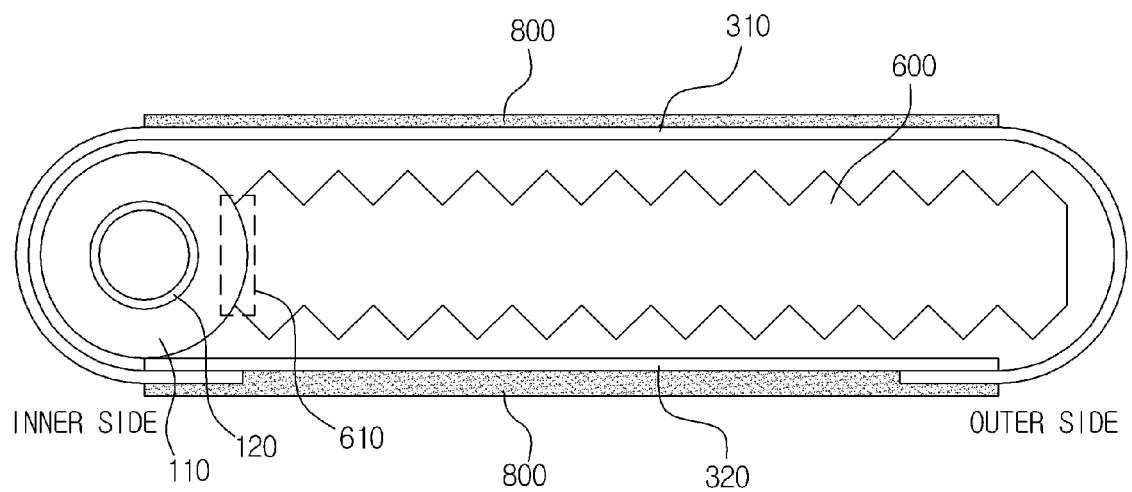
FIG. 60 is a view illustrating a gasket according to the twenty-second exemplary embodiment of the present invention.
Figure 61:
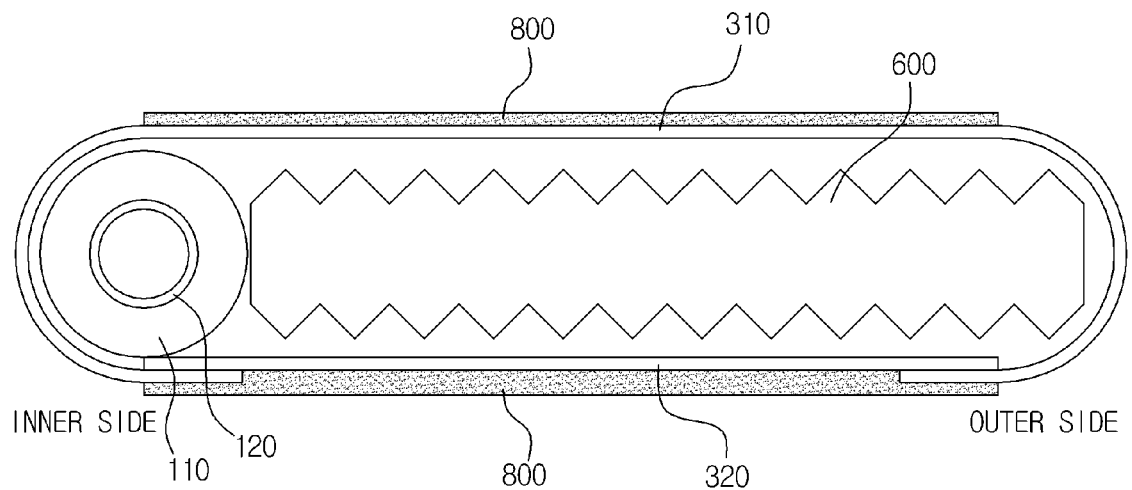
FIG. 61 is a view illustrating a modified form of the gasket according to the twenty-second exemplary embodiment of the present invention.
Figure 62:
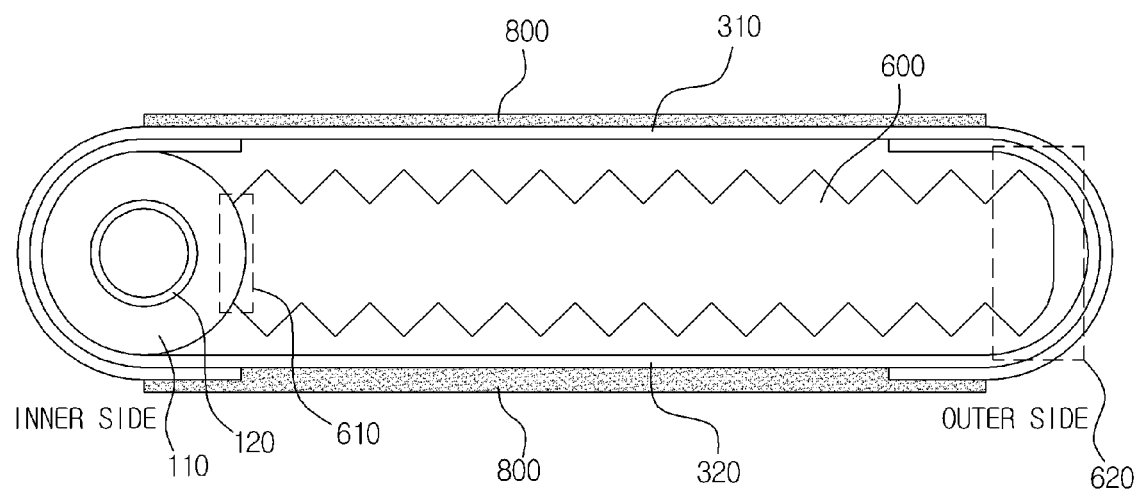
FIG. 62 is a view illustrating a gasket according to the twenty-third exemplary embodiment of the present invention.
Figure 63:
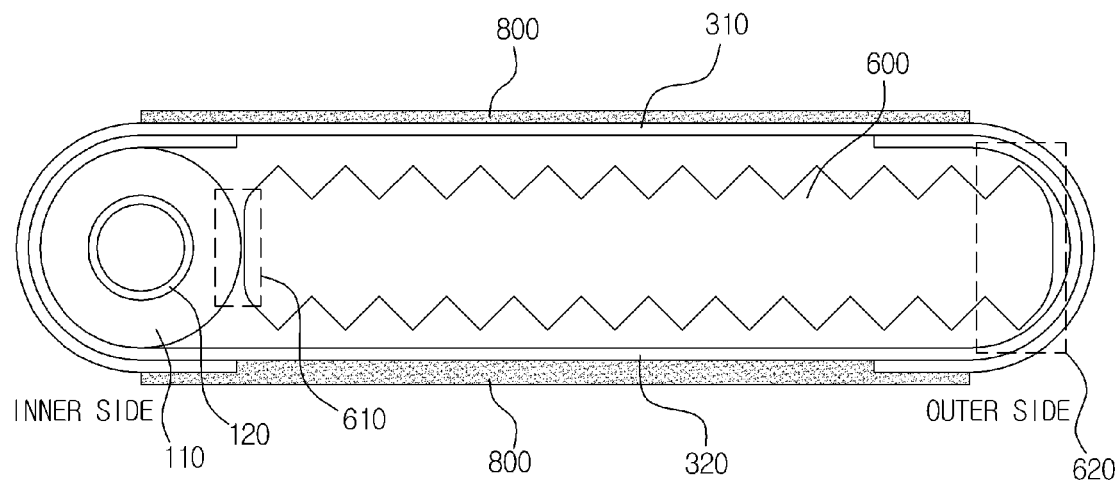
FIG. 63 is a view illustrating a modified form of the gasket according to the twenty-third exemplary embodiment of the present invention.
Figure 64:
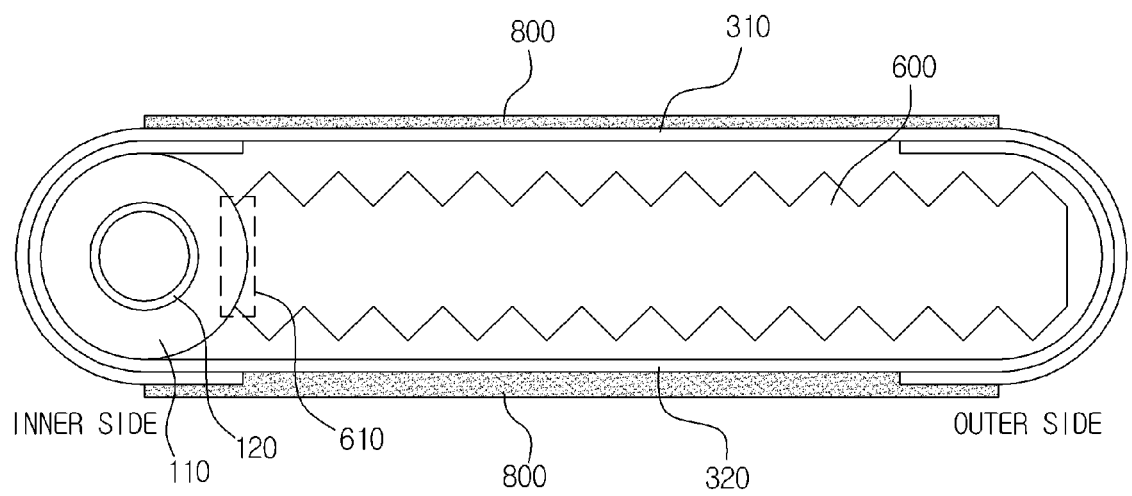
FIG. 64 is a view illustrating a modified form of the gasket according to the twenty-third exemplary embodiment of the present invention.
Figure 65:
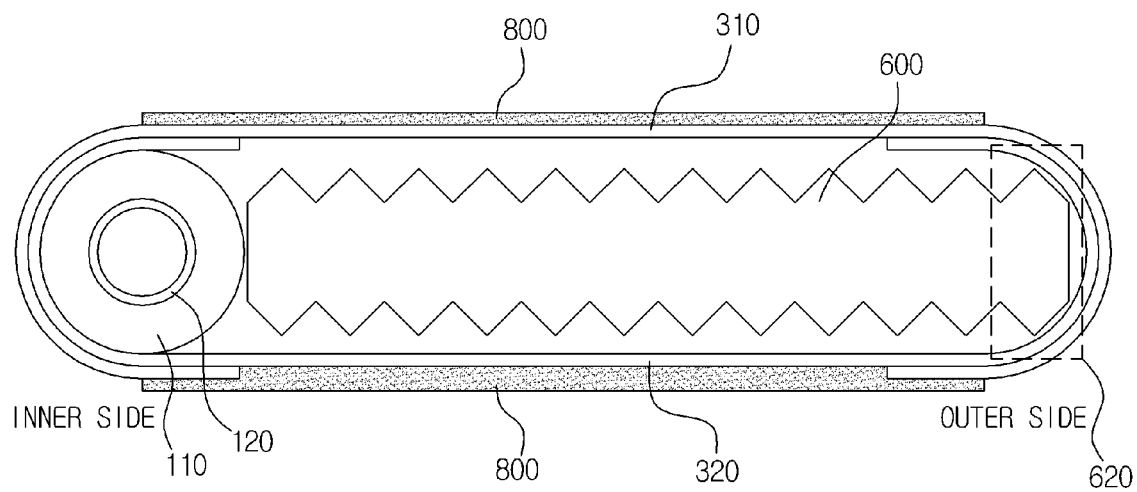
FIG. 65 is a view illustrating a modified form of the gasket according to the twenty-third exemplary embodiment of the present invention.
Figure 66:
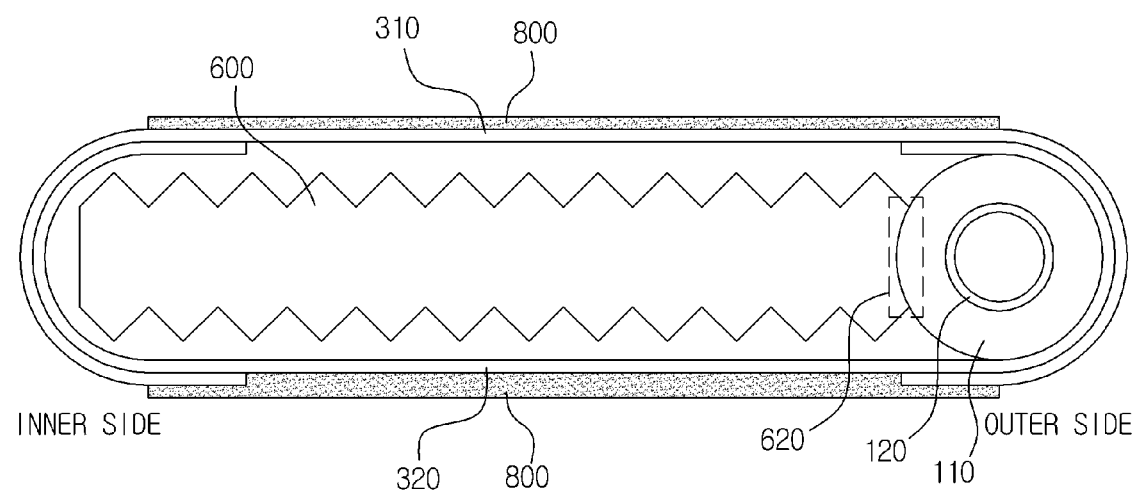
FIG. 66 is a view illustrating a gasket according to the twenty-fourth exemplary embodiment of the present invention.
Figure 67:
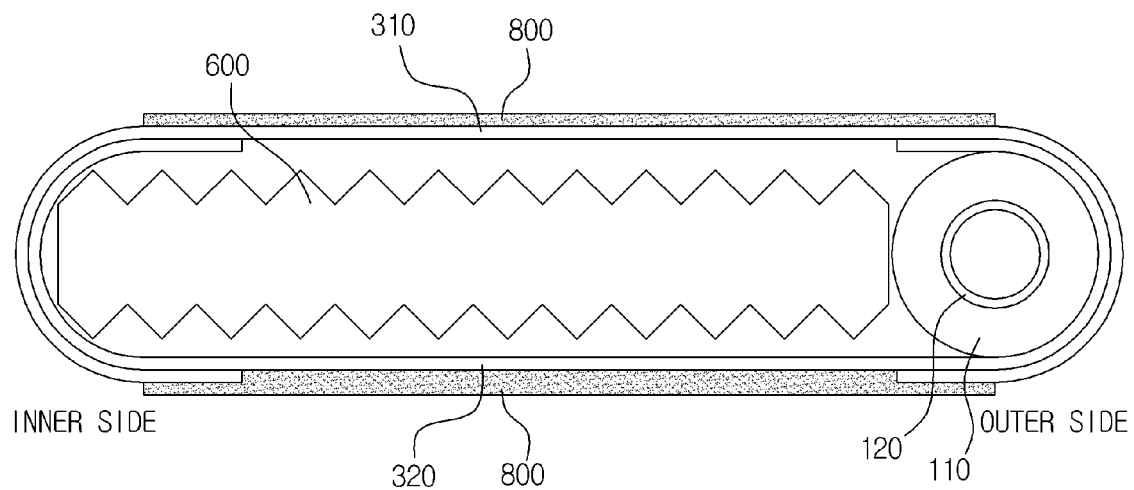
FIG. 67 is a view illustrating a modified form of the gasket according to the twenty-fourth exemplary embodiment of the present invention.
Figure 68:
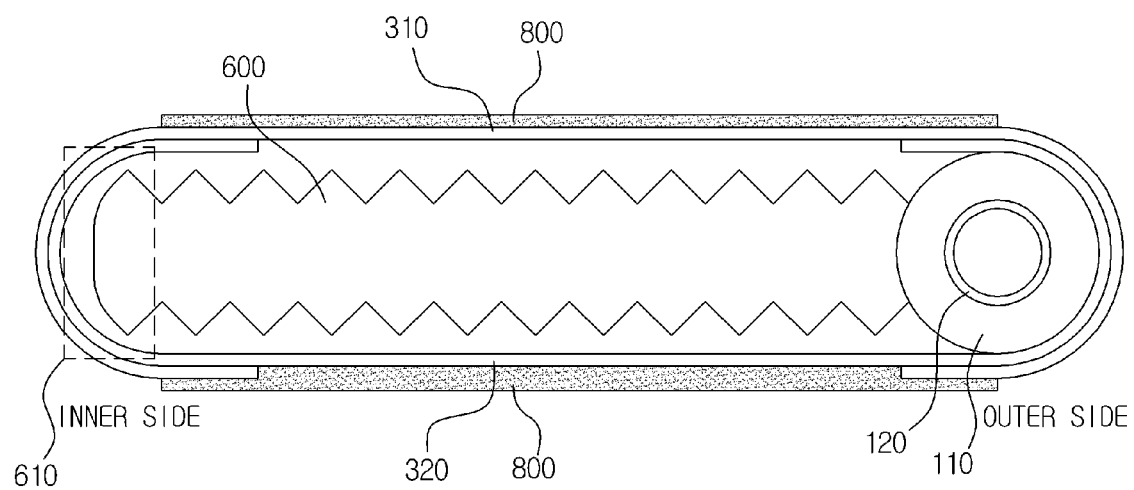
FIG. 68 is a view illustrating a modified form of the gasket according to the twenty-fourth exemplary embodiment of the present invention.
Figure 69:
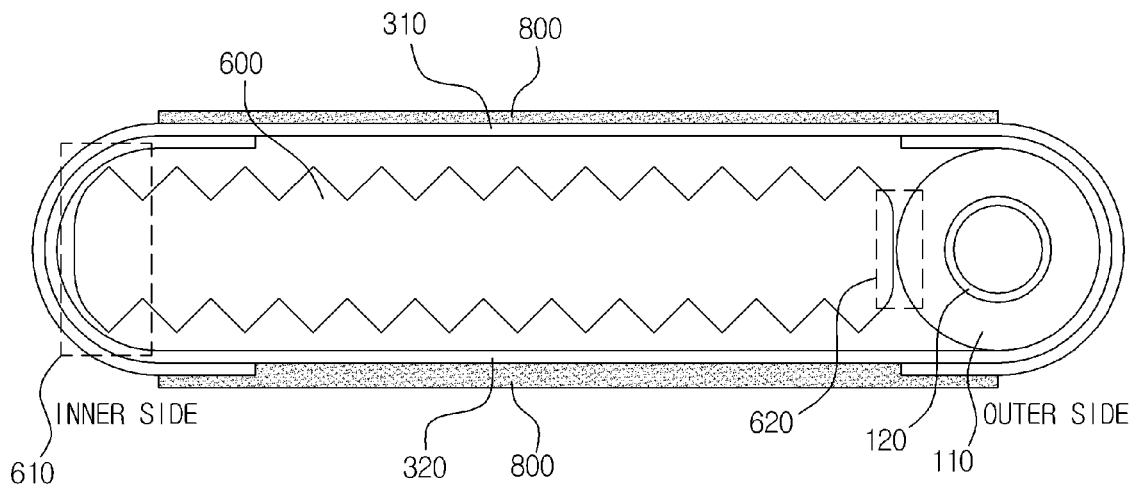
FIG. 69 is a view illustrating a modified form of the gasket according to the twenty-fourth exemplary embodiment of the present invention.

FIGS. 60 to 61 are views illustrating the gaskets and the modified forms thereof according to the twenty-second exemplary embodiment of the present invention.

The gasket according to the twenty-second exemplary embodiment is an invention that is characterized in that sealing layers 800 are further provided on the first jacket 320 and the second jacket 310 of the gasket according to the eighth exemplary embodiment in order to enhance the sealing property thereof.

FIGS. 62 to 65 are views illustrating the gaskets and the modified forms thereof according to the twenty-third exemplary embodiment of the present invention.

The gasket according to the twenty-third exemplary embodiment is an invention that is characterized in that sealing layers 800 are further provided in the gasket according to the ninth exemplary embodiment in order to enhance the sealing property thereof.

FIGS. 66 to 69 are views illustrating the gaskets and the modified forms thereof according to the twenty-fourth exemplary embodiment of the present invention.

The gasket according to the twenty-fourth exemplary embodiment of the present invention is characterized in that sealing layers 800 are further provided on the first jacket 320 and the second jacket 310 of the gasket according to the tenth exemplary embodiment.

Figure 70:
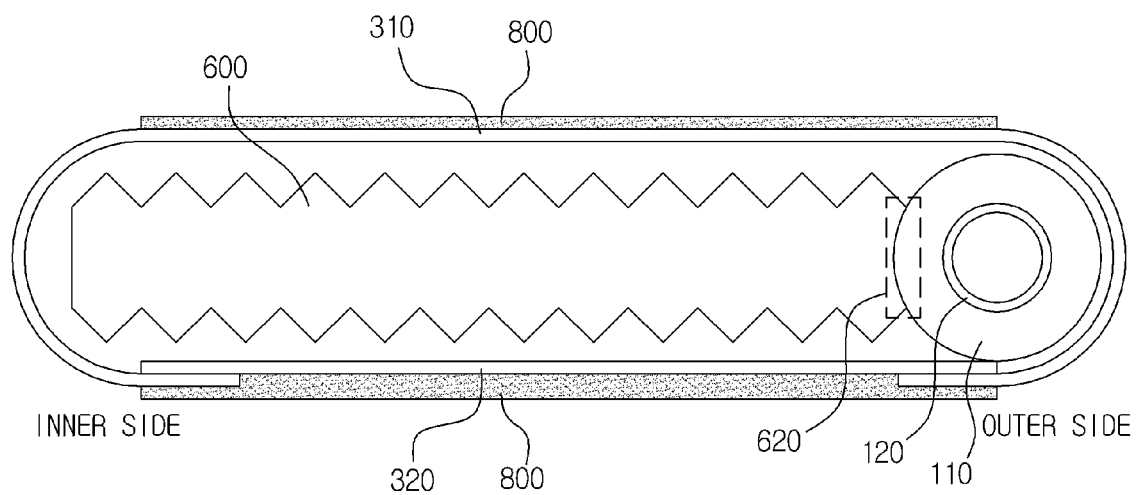
FIG. 70 is a view illustrating a gasket according to the twenty-fifth exemplary embodiment of the present invention.
Figure 71:
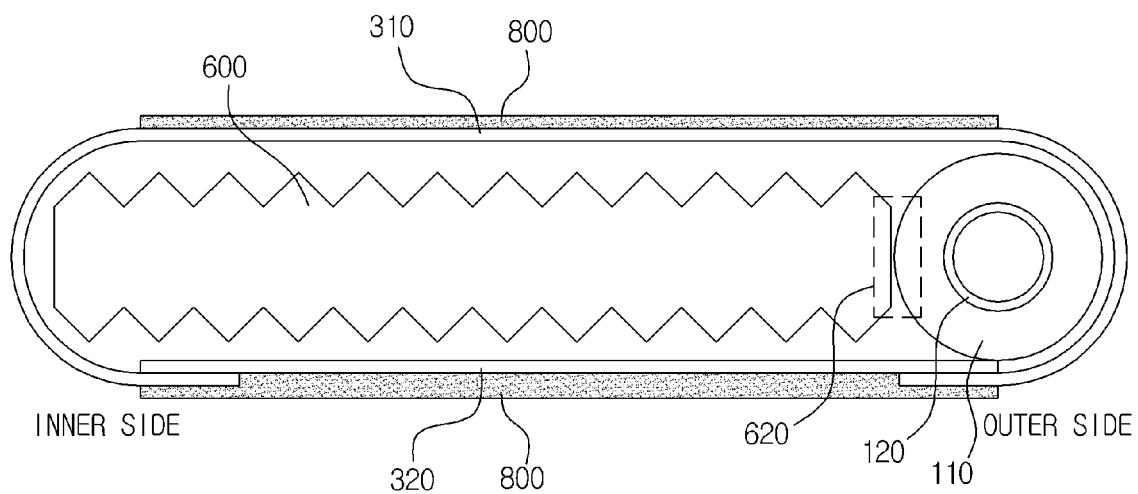
FIG. 71 is a view illustrating a modified form of the gasket according to the twenty-fifth exemplary embodiment of the present invention.

FIGS. 70 to 71 are views illustrating the gaskets and the modified forms thereof according to the twenty-fifth exemplary embodiment of the present invention.

The gasket according to the twenty-fifth exemplary embodiment of the present invention is characterized in that sealing layers 800 are further provided in the gasket according to the eleventh exemplary embodiment.

The FIGS. 72 to 76 hereinbelow illustrate the gaskets characterized in that the sealing layers are formed in the upper side and the lower side of the kammprofile inside the jacket. Owing to the inner sealing layers 810 formed on the upper surface and the lower surface of the kammprofile 600, such gaskets of the exemplary embodiments can achieve the effect of preventing damages to the kammprofile 600 caused by the external pressure.

Figure 72:
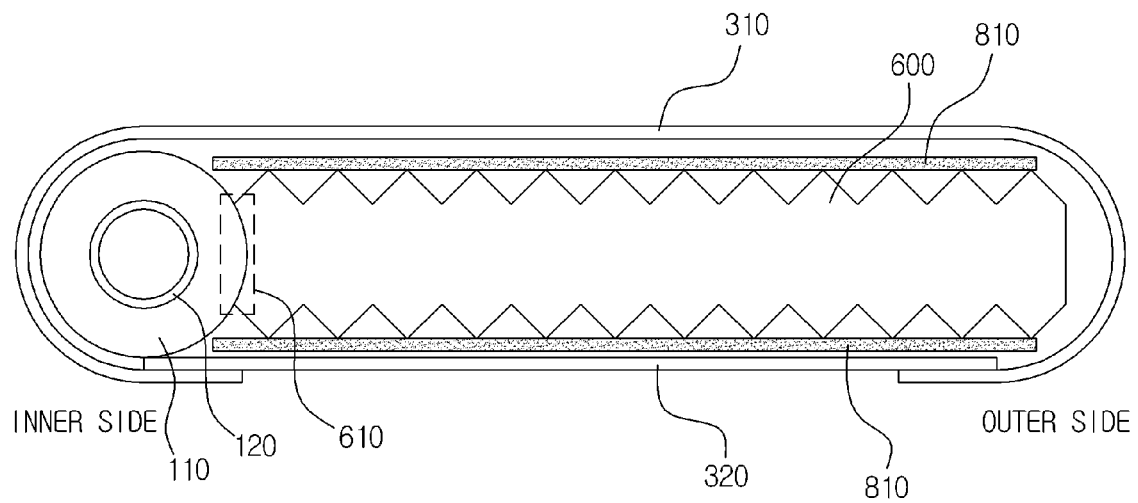
FIG. 72 is a view illustrating a gasket according to the twenty-sixth exemplary embodiment of the present invention.

FIG. 72 is a view illustrating a gasket according to the twenty-sixth exemplary embodiment and characterized in that internal sealing layers 810 are further provided respectively in the upper surface and the lower surface of the kammprofile 600 of the gasket according to the first exemplary embodiment.

Figure 73:
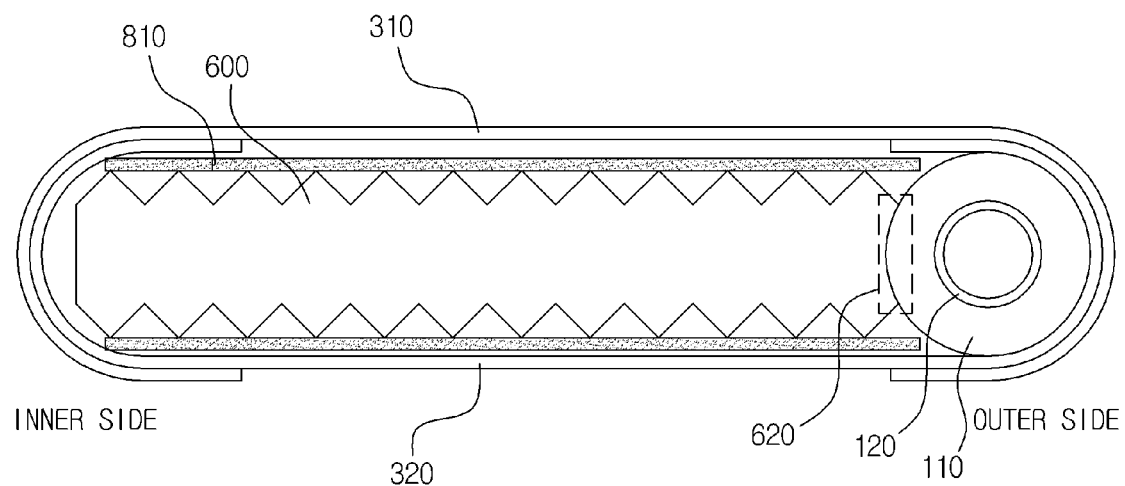
FIG. 73 is a view illustrating a gasket according to the twenty-seventh exemplary embodiment of the present invention.

FIG. 73 is a view illustrating a gasket according to the twenty-seventh exemplary embodiment and characterized in that internal sealing layers 810 are further provided respectively in the upper surface and the lower surface of the kammprofile 600 of the gasket according to the tenth exemplary embodiment.

Figure 74:
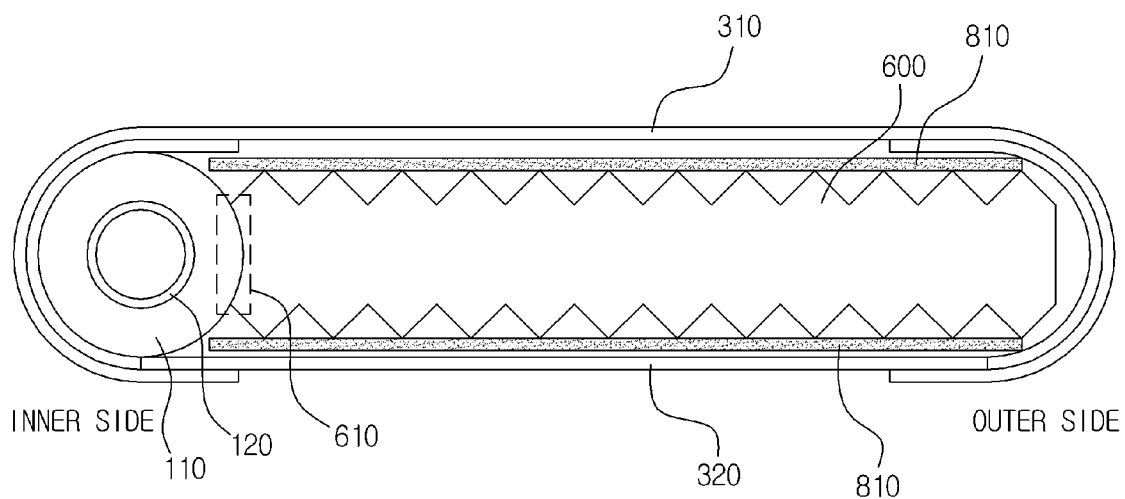
FIG. 74 is a view illustrating a gasket according to the twenty-eighth exemplary embodiment of the present invention.

FIG. 74 is a view illustrating a gasket according to the twenty-eighth exemplary embodiment and characterized in that internal sealing layers 810 are further provided in the upper surface and the lower surface of the kammprofile 600 of the gasket according to the eleventh exemplary embodiment.

Figure 75:
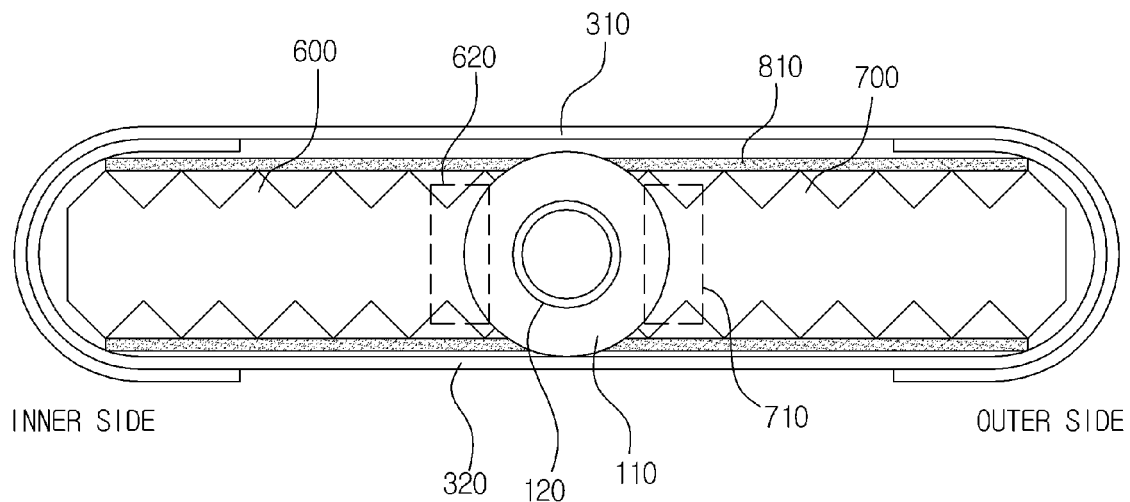
FIG. 75 is a view illustrating a gasket according to the twenty-ninth exemplary embodiment of the present invention.

FIG. 75 is a view illustrating a gasket according to the twenty-eighth exemplary embodiment and characterized in that internal sealing layers 810 are further provided in the upper surface and the lower surface of the kammprofile 600 of the gasket according to the fourteenth exemplary embodiment.

The effect that can be achieved owing to this is same as the one previously reviewed.

Figure 76:
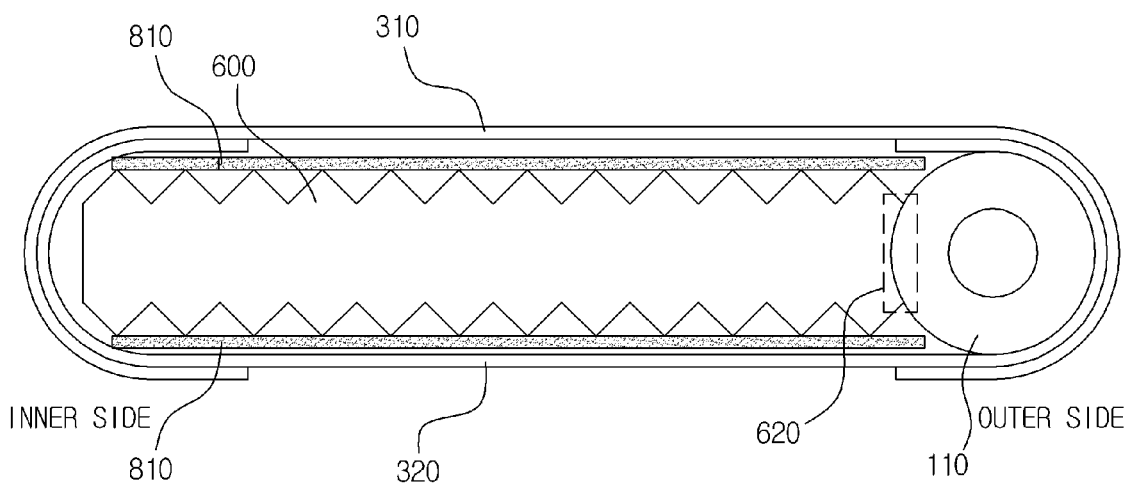
FIG. 76 is a view illustrating a gasket according to the thirtieth exemplary embodiment of the present invention.

FIG. 76 is a view illustrating a gasket according to the thirtieth exemplary embodiment and characterized in that internal sealing layers 810 are further provided in the upper surface and the lower surface of the kammprofile 600 of the gasket according to the third exemplary embodiment.

The FIGS. 77 to 80 hereinbelow illustrate the gaskets not only provided with the sealing layers 800 on the jacket of the gasket, but also the gaskets further provided with the internal sealing layers 810 respectively in the upper surface and the lower surface of the kammprofile 600 inside thereof through the exemplary embodiments.

Thus, the gaskets according to such exemplary embodiments can provide a better sealing property owing to the sealing layers 800 formed on the jackets, and at the same time, have an effect of preventing the damages to the kammprofile 600 caused by the external pressure owing to the internal sealing layers 810 being formed on the upper surface and the lower surface of the kammprofile 600 inside the gasket.

Figure 77:
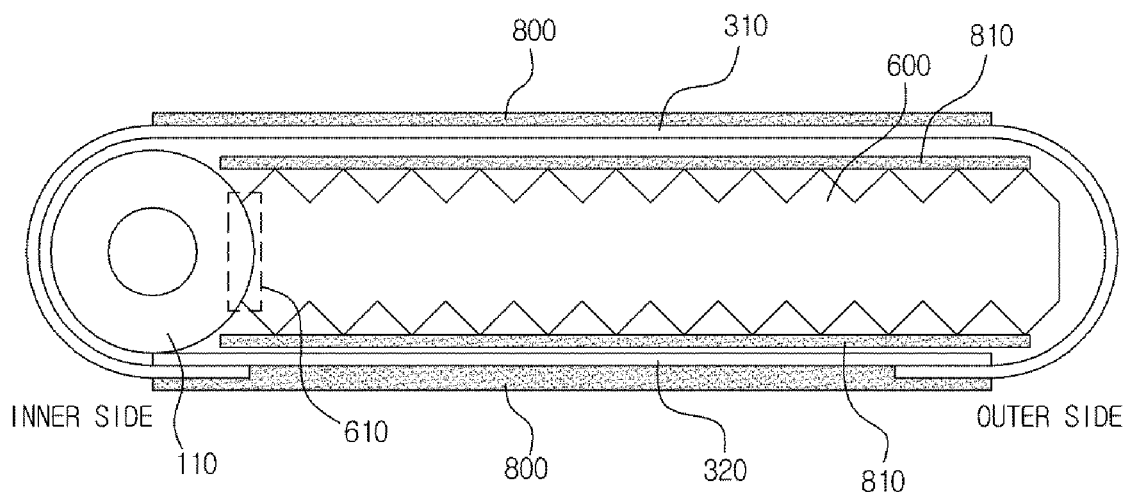
FIG. 77 is a view illustrating a gasket according to the thirty-first exemplary embodiment of the present invention.

FIG. 77 is a view illustrating a gasket according to the thirty-first exemplary embodiment and characterized in that internal sealing layers 810 are further provided in the upper surface and the lower surface of the kammprofile 600 of the gasket according to the fifteenth exemplary embodiment.

Figure 78:
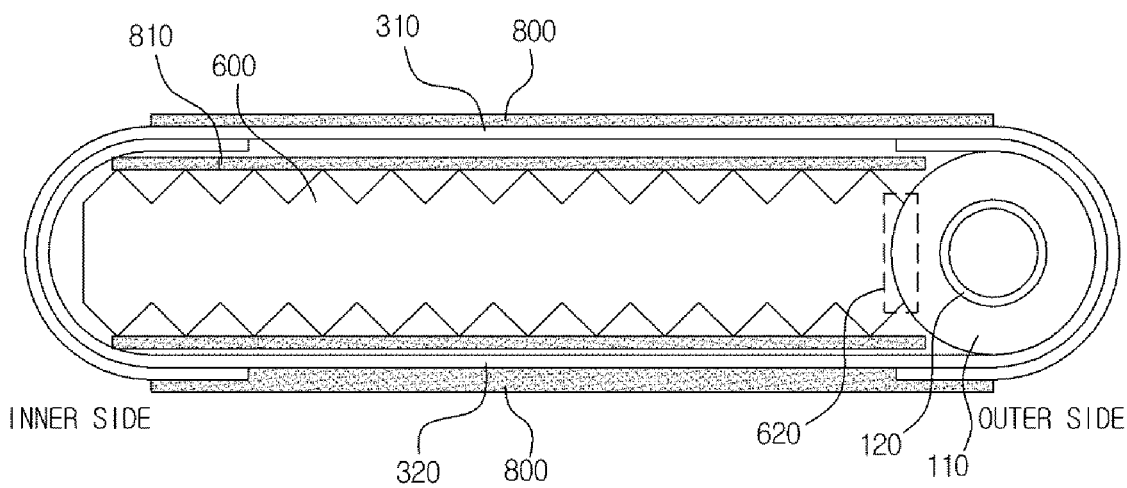
FIG. 78 is a view illustrating a gasket according to the thirty-second exemplary embodiment of the present invention.

FIG. 78 is a view illustrating a gasket according to the thirty-second exemplary embodiment and characterized in that sealing layers 800 are further provided on the first jacket 320 and the second jacket 310 the gasket according to the twenty-seventh exemplary embodiment.

Figure 79:
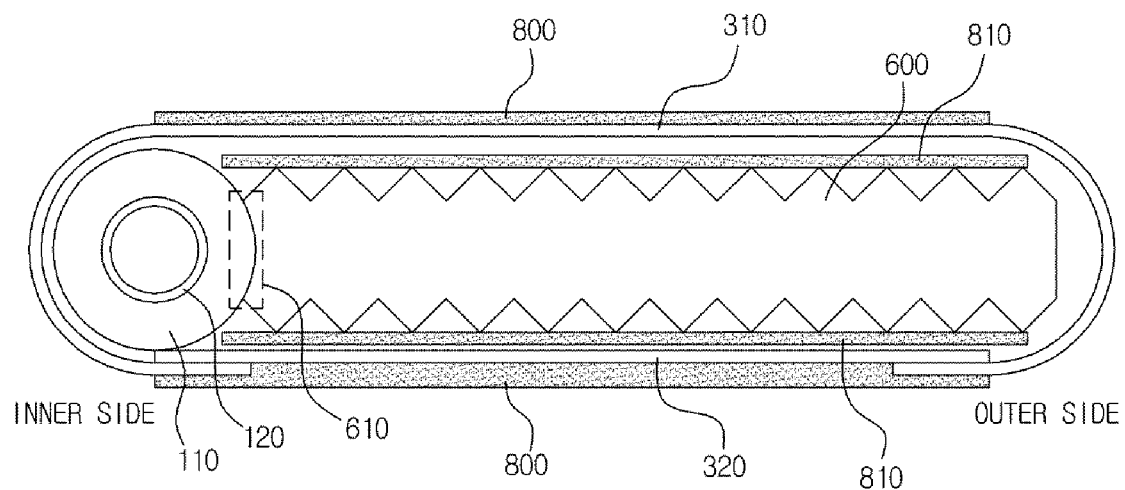
FIG. 79 is a view illustrating a gasket according to the thirty-third exemplary embodiment of the present invention.

FIG. 79 is a view illustrating a gasket according to the thirty-third exemplary embodiment and characterized in that sealing layers 800 are further provided on the first jacket 320 and the second jacket 310 the gasket according to the twenty-eighth exemplary embodiment.

Figure 80:
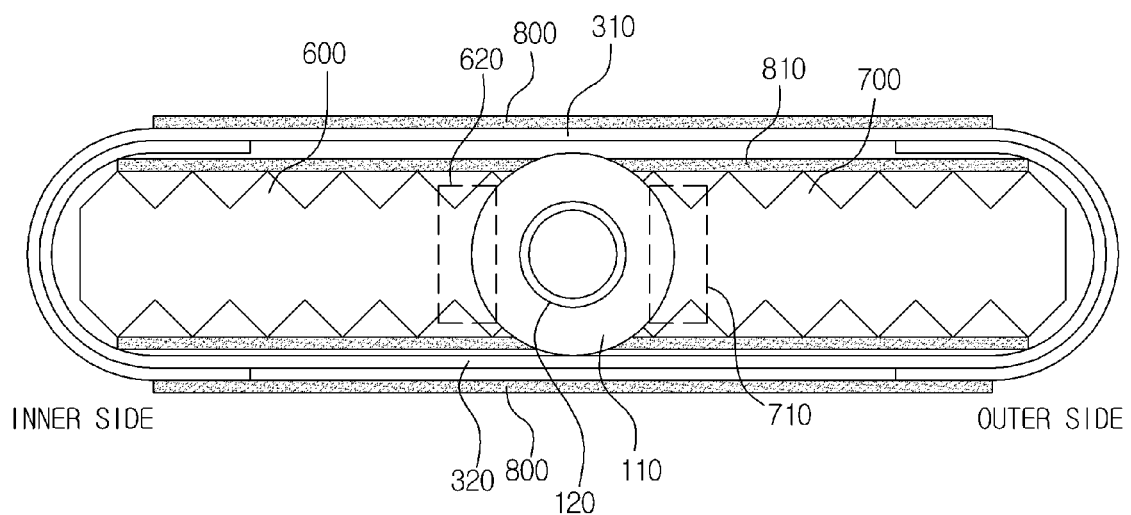
FIG. 80 is a view illustrating a gasket according to the thirty-fourth exemplary embodiment of the present invention.

FIG. 80 is a view illustrating a gasket according to the thirty-fourth exemplary embodiment and characterized in that sealing layers 800 are further provided on the first jacket 320 and the second jacket 310 the gasket according to the twenty-ninth exemplary embodiment.

Figure 81:
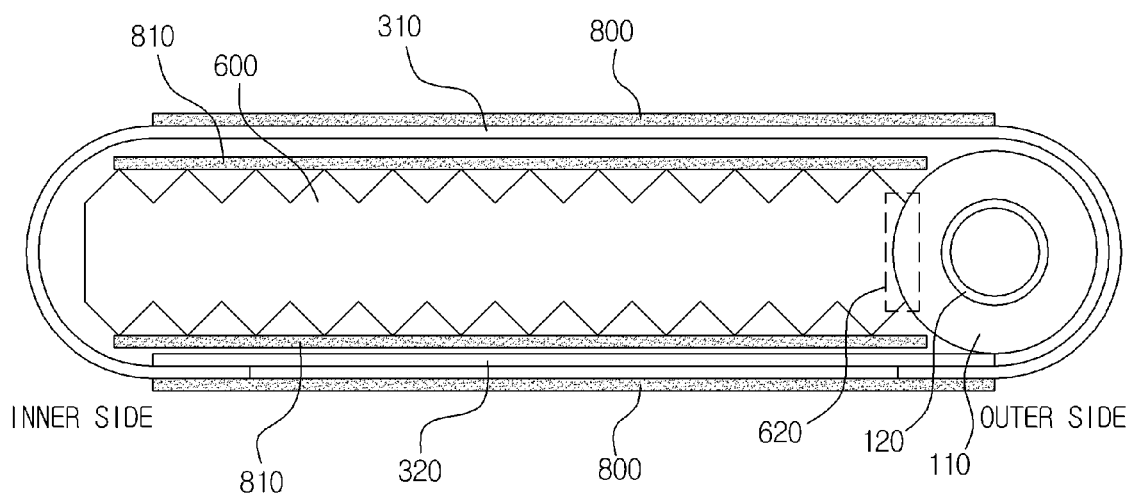
FIG. 81 is a view illustrating a gasket according to the thirty-fifth exemplary embodiment of the present invention.

FIG. 81 is a view illustrating a gasket according to the thirty-fifth exemplary embodiment and characterized in that and includes: sealing layers 800 formed on the first jacket 320 and the second jacket 310; and internal sealing layers 810 formed in the upper surface and the lower surface of the kammprofile 600 inside the gasket according to the seventeenth exemplary embodiment.

According to a gasket and manufacturing method thereof disclosed in a preferred exemplary embodiment of the present invention, there are advantageous effects as follows.

Firstly, there is an effect in that a high clamping force and restoring force can be obtained when compared to other gasket of the same size. Therefore, there is an effect that the sealing effect is enhanced even under a high temperature and a high pressure conditions.

Secondly, there is an effect in that since O-ring member(s) is(are) disposed in one side or in both sides or in the center of the kammprofile, the compressing phenomenon of the gasket can be suppressed. Therefore, for a gasket and manufacturing method thereof according to a preferred exemplary embodiment of the present invention, there is an effect of enhancing the restoring force and the sealing property. In addition, there is an effect in that a gasket wherein the restoring force is further enhanced can be provided by mounting a spring inside the O-ring member.

Thirdly, there is an effect in that by further providing sealing layers formed with carbon, mica, ceramics, silver, and the like in the upper and the lower surfaces of the gasket, the tight contact of the joint surface between the gasket and the flange can be maintained more firmly.

Fourthly, there is an effect in that by using a flat coil spring as a core spring inside of the O-ring member, the restoring force can be obtained and at the same time the pressures are being equally distributed, thereby extending the lifetime of the gasket.

Fifthly, damages to the O-ring member caused by the left-to-right movement of the kammprofile inside the gasket can be avoided by forming the portion of kammprofile in contact with the O-ring to have a concave curvature having a similar radius of curvature to that of the O-ring member. Thus, there is an effect in that the durability of the gasket can be further enhanced.

Sixthly, there is an effect in that a gasket which is more strong against an external pressure can be provided through the structure wherein the inner side and the outer side jackets of the gasket are being overlapped.

Seventhly, there is an effect in that the kammprofile, the O-ring member, and the like can be protected by the internal sealing layers formed inside the gasket. In addition, there is an effect in that damages to the jacket caused by the kammprofile can be avoided.

Although the present invention herein has been described with reference to the preferred embodiments as described above, it will be apparent to those skilled in the art that various changes and modification may be made to the above described embodiments, without departing from the scope and spirit of the present invention as disclosed in the accompanying claims.

What is claimed is:

1. A gasket, being interposed between flanges which are connecting portions of pipes, the gasket comprising:
   a kammprofile having an inner side end portion and an outer side end portion;
   an O-ring member provided at an inner side of the inner side end portion;
   a first jacket encasing the kammprofile and the O-ring member from a lower side of the kammprofile, wherein one end portion of the first jacket is bent up around the O-ring member and the other end portion of the first jacket is bent up around the outer end portion of the kammprofile;
   a second jacket encasing the kammprofile and the O-ring member from an upper side of the kammprofile, wherein one end portion of the second jacket is bent down around the O-ring member to be overlapped with the first jacket, and the other end portion of the second jacket is bent down around the outer end portion of the kammprofile to be overlapped with the first jacket;
   a first sealing layer formed on an upper surface and a lower surface of the kammprofile, respectively;
   a second sealing layer formed to cover an upper side of the second jacket; and
   a third sealing layer formed to cover both a lower side of the first jacket and a portion of the second jacket overlapped with the lower side of the first jacket,
   wherein the inner side end portion has a concave curvature towards the O-ring member, and the outer side end portion has a convex curvature towards the first jacket.

2. The gasket according to claim 1, wherein sawtooth-like grooves are formed on the upper surface and the lower surface of the kammprofile, respectively.

3. The gasket according to claim 2, wherein the sawtooth-like grooves are formed through a serration process.

4. The gasket according to claim 1, wherein a spring is provided inside the O-ring member.

5. The gasket according to claim 4, wherein the spring includes a flat coil spring.

6. The gasket according to claim 1, wherein the first sealing layer, the second sealing layer and the third sealing layer are formed of any one selected from the group consisting of carbon, mica, polytetrafluoroethylene (PTFE), silver, atomized stainless steel, ceramics, and a combination thereof.

* * * * *